US007397950B2

(12) United States Patent
Shilman et al.

(10) Patent No.: US 7,397,950 B2
(45) Date of Patent: *Jul. 8, 2008

(54) HANDWRITING LAYOUT ANALYSIS OF FREEFORM DIGITAL INK INPUT

(75) Inventors: Michael M. Shilman, Seattle, WA (US); Zile Wei, Beijing (CN); Yu Zou, Beijing (CN); Patrice Y. Simard, Bellevue, WA (US); Sashi Raghupathy, Redmond, WA (US); F. David Jones, Redmond, WA (US); Charlton E. Lui, Redmond, WA (US); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 216 days.

This patent is subject to a terminal disclaimer.

(21) Appl. No.: 11/281,462

(22) Filed: Nov. 18, 2005

(65) Prior Publication Data

US 2006/0078202 A1   Apr. 13, 2006

Related U.S. Application Data

(63) Continuation of application No. 10/143,865, filed on May 14, 2002, now Pat. No. 7,050,632.

(51) Int. Cl.
*G06K 9/18* (2006.01)
*G06K 9/00* (2006.01)
*G06K 9/34* (2006.01)
(52) U.S. Cl. ........................ 382/186; 382/103; 382/179
(58) Field of Classification Search ................ 382/179, 382/186, 103
See application file for complete search history.

(56) References Cited

U.S. PATENT DOCUMENTS 5,613,019 A   3/1997   Altman et al.
5,889,523 A   3/1999   Wilcox (Continued)

FOREIGN PATENT DOCUMENTS

WO   WO 95/34047   12/1995

OTHER PUBLICATIONS

L.A. Fletcher, et al., "A Robust Algorithm for Text String Separation from Mixed Text/Graphics Images," *IEEE Transactions on Pattern Analysis and Machine Intelligence*, vol. 10, No. 6, Nov. 1988, pp. 910-918.

(Continued)

*Primary Examiner*—Brian Q Le
*Assistant Examiner*—Jonathan C Schaffer
(74) *Attorney, Agent, or Firm*—Lee & Hayes, PLLC

(57) ABSTRACT

Electronic ink layout analysis systems and methods provide flexibility and efficiency in organizing, analyzing, and processing digital ink. These layout analysis systems and methods allow users substantial freedom in entering electronic ink into a pen-based computer system. Using these systems and methods, a user's input digital ink is not constrained by requirements that a user write in a specific screen orientation, that a user write in one specific orientation on all portions of a page, or that a user write using a specific minimum or maximum sized stroke. Rather, the systems and methods freely allow the user to write anywhere on a given page, in any orientation or size, while still enabling effective and efficient handwriting recognition and other processing of the input digital ink.

20 Claims, 20 Drawing Sheets

U.S. PATENT DOCUMENTS

| | | | |
|---|---|---|---|
| 6,535,897 B1* | 3/2003 | Altman et al. | 715/541 |
| 6,651,221 B1* | 11/2003 | Thompson et al. | 715/541 |
| 7,050,632 B2* | 5/2006 | Shilman et al. | 382/186 |
| 2002/0097909 A1 | 7/2002 | Perrone et al. | |

OTHER PUBLICATIONS

K. Machii, et al., "On-Line Text/Drawings Segmentation of Handwritten Patterns," *Proceedings of the Second International Conference on Document Analysis and Recognition,* Oct. 20-22, 1993, Tsukuba Science City, Japan, pp. 710-713.

Online Form-Free Japanese Character Segmentation, IBM Technical Disclosure Bulletin, vol. 34, No. 4B, pp. 365-367, Sep. 1991.

Michael Shilman et al., "Statistical Visual Language Models for Ink Parsing", Proc. AAAI Spring Symposium on Sketch Understanding, pp. 126-132, Mar. 2002.

Patrick Chiu et al., "A Dynamic Grouping Technique for Ink and Audio Notes", pp. 195-202, Nov. 1998.

Giovanni Seni et al., "Segmenting handwritten text lines into words using distance algorithms", Center of Excellence for Document Analysis and Recognition (CEDAR), SPIE vol. 1661, pp. 61-72, 1992.

European Search Report dated May 21, 2004.

* cited by examiner

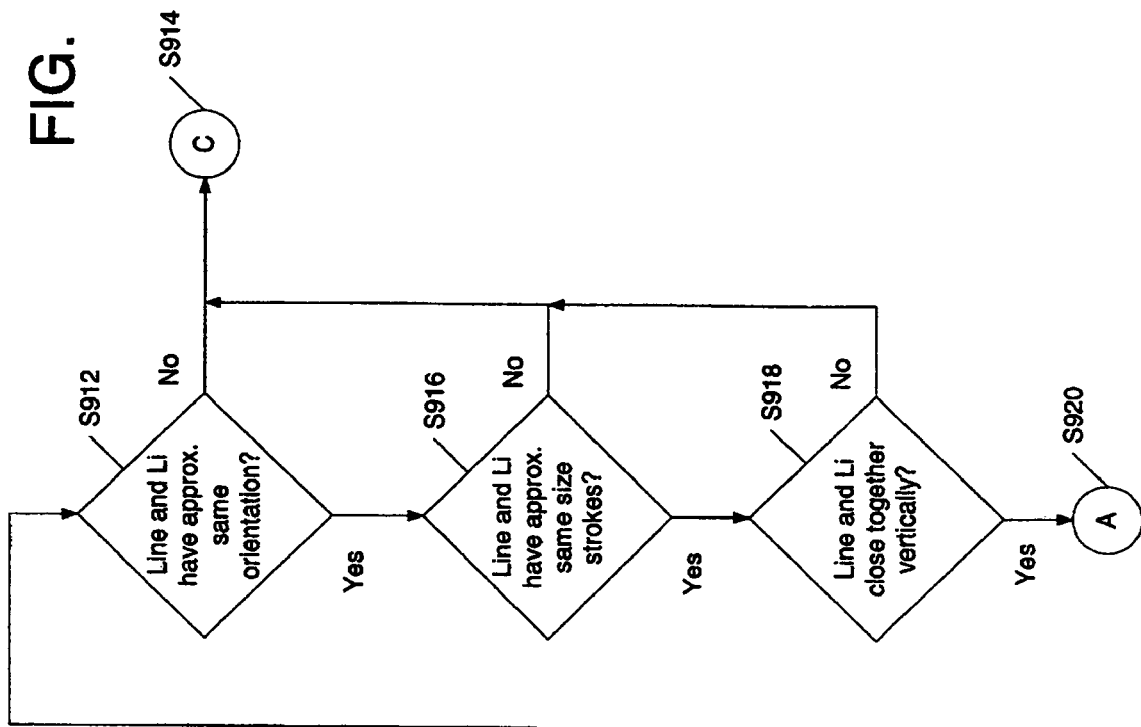
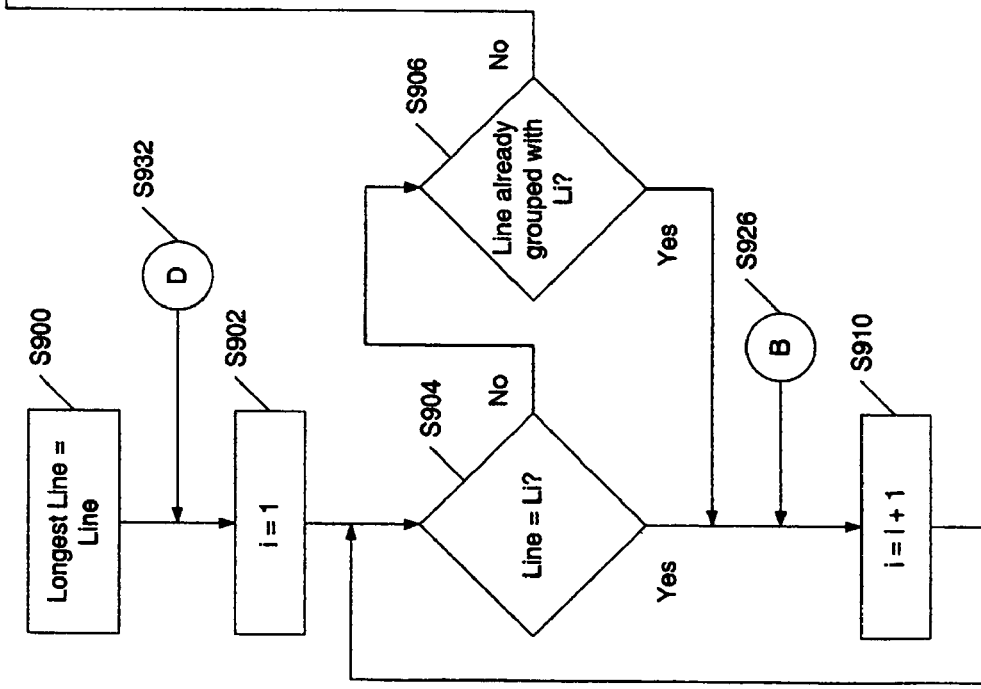
FIG. 9A

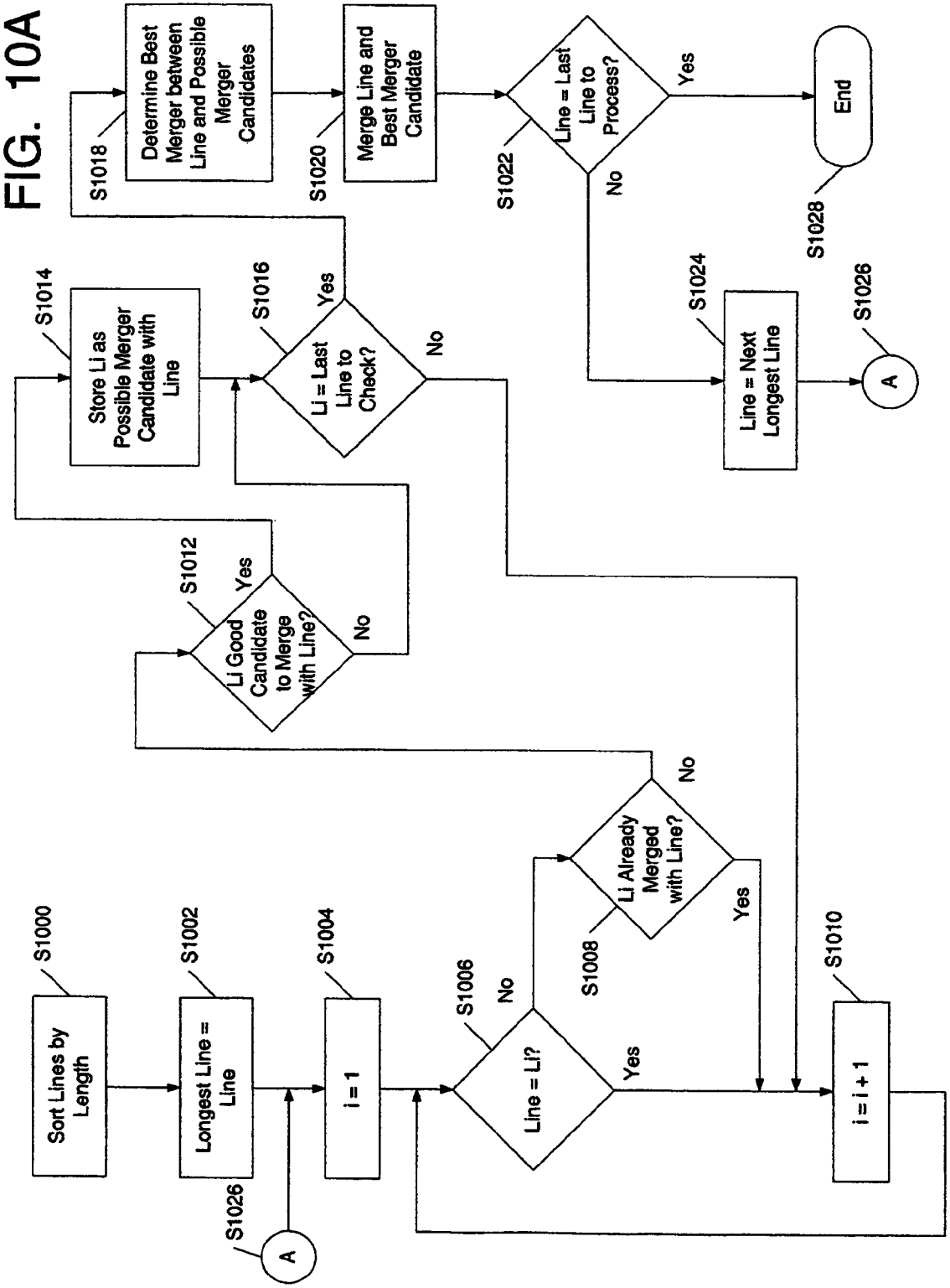

HANDWRITING LAYOUT ANALYSIS OF FREEFORM DIGITAL INK INPUT

RELATED APPLICATION DATA

This application is a continuation of co-pending U.S. patent application Ser. No. 10/143,865, filed May 14, 2002 in the name of Michael M. Shilman, et al., entitled "Handwriting Layout Analysis of Freeform Digital Ink Input." This earlier priority application is entirely incorporated herein by reference.

TECHNICAL FIELD

Aspects of the present invention are directed generally to systems and methods for controlling a graphical user interface (GUI). More particularly, aspects of the present invention relate to systems and methods for processing handwritten digital ink, as well as to computer-readable media including computer-executable instructions for operating the systems and/or performing the methods.

BACKGROUND

Typical computer systems, especially computer systems using graphical user interfaces (GUIs), such as Microsoft WINDOWS®, are optimized for accepting user input from one or more discrete input devices, such as a keyboard for entering text, and a pointing device, such as a mouse with one or more buttons, for operating the user interface. The ubiquitous keyboard and mouse interface provides for fast creation and modification of documents, spreadsheets, database fields, drawings, photos and the like. However, a significant gap exists between the flexibility provided by the keyboard and mouse interface compared with non-computer (i.e., standard) pen and paper. With the standard pen and paper, a user may edit a document, write in non-horizontal directions, write notes in a margin, draw pictures and other shapes, link separate sets of notes by connecting lines or arrows, and the like. In some instances, a user may prefer to use a pen to mark-up a document rather than review the document on-screen because of the ability to freely make notes outside of the confines of the keyboard and mouse interface.

Some computer systems, however, permit a user to write on a screen (e.g., using a "stylus" or "pen" for writing notes on an electronic input screen). For example, the Microsoft READER application permits one to add digital ink (also referred to herein as "electronic ink" or "ink") to a document. The system stores the ink and provides it to a user when requested. Other applications (for example, drawing applications as known in the art associated with the Palm 3.x and 4.x and PocketPC operating systems) permit the capture and storage of drawings. These drawings may include other properties associated with the ink strokes used to make up the drawings. For instance, line width and color may be stored with the ink. One goal of these systems is to replicate the look and feel of physical ink being applied to a piece of paper.

One activity normally reserved for physical ink and paper is note taking. Personal notes are unique as each user. Some users take notes using complete sentences, while others jot down thoughts or concepts and then link the concepts using arrows and the like. The latter type of notes tends to be written at different locations on a page and/or at different angles on the page. Additionally, some users revisit notes later and add further thoughts, clarify, and/or edit previously recorded notes. The value present in handwritten notes may rest not only in the actual text of the information recorded, but also in the layout of the notes and the juxtaposition of some notes with respect to others. Further value may be added in the speed at which users take notes.

The transition from an ink pen and physical paper note taking arrangement to a computer-based note taking arrangement may prove difficult. While computer-based note taking systems can provide advantages including handwriting recognition functionality, searchability, and written text reformatting, users may quickly become disoriented or frustrated when the computer-based system does not function as expected.

A number of systems for electronically capturing, rearranging, and displaying handwriting as digital ink are known (for example, the InkWriter® system from Aha! Software, now owned by Microsoft Corporation of Redmond, Wash.). These systems capture ink strokes and group the strokes into characters and words. Writing in multiple regions on a page, as many users do, can quickly result in confusion, for example, if information intended to be maintained as separate notes is combined by the system into a single, incoherent note. Also, in some existing systems, drag selection (akin to holding down a mouse button and dragging to select text in a text editor) may select large areas of blank space (i.e., white space) on the page. When this selected text is cut and pasted (using standard computer-based text editing concepts) or otherwise utilized, the large volume of selected blank space may produce an unintended and surprising result. This result is counterintuitive to the average computer user because conventional text editing systems work differently.

Additionally, some known systems that capture ink strokes require relatively structured ink input in order to function in an acceptable manner. For example, users of such systems typically are admonished to "write neatly" or "write between the lines" in a horizontal orientation or write in a specified ink input area. Failure to follow these instructions may cause recognition errors or other errors, e.g., when the electronic ink is presented to an associated handwriting recognition system, thereby limiting the usefulness of the system for electronic note taking. Also, some users may quickly become frustrated with these errors and limitations of the system and/or become frustrated when forced to constrain and adapt their handwriting to better "work around" the limitations of the system.

These shortcomings of existing electronic note taking systems effectively create barriers to adoption of stylus-based computing systems.

SUMMARY

The present invention provides flexible and efficient systems, methods, and computer-readable media for organizing, analyzing, and processing digital ink.

More specifically, the present invention provides systems and methods that allow users substantial freedom in entering electronic ink into a pen-based computer system. Using systems and methods according to this invention, users are not constrained by requirements that they write in a specific computer screen orientation, that they write in one specific orientation on all portions of a page, that they write using a specific minimum or maximum sized text, or that they write in a time ordered fashion. Rather, the systems and methods according to this invention freely allow users to write anywhere on a given page, in any orientation or size, at any time, using multiple text sizes or orientations on a given page, while still enabling effective and efficient handwriting recognition and other processing of the input digital ink. The invention further relates to computer-readable media, including computer-executable instructions, for operating the systems and/or performing the methods.

These and other features and aspects of the invention will be apparent upon consideration of the following detailed description.

BRIEF DESCRIPTION OF THE DRAWINGS

The foregoing summary, as well as the following detailed description, may be better understood when read in conjunction with the accompanying drawings, which are included by way of example, and not by way of limitation with regard to the claimed invention.

FIGS. 9A and 9B illustrate an exemplary flow diagram of a spatial block grouping procedure or parse engine useful in some examples of the layout analysis procedure of the present invention.

FIG. 10A illustrates an exemplary flow diagram of a spatial line grouping procedure or parse engine useful in some examples of the layout analysis procedure of the present invention.

DETAILED DESCRIPTION

As described above, examples of the present invention relate to flexible and efficient systems and methods for organizing, analyzing, and processing digital ink, e.g., in a pen-based computing system. The following describes various examples of the invention in more detail.

Figure 3:
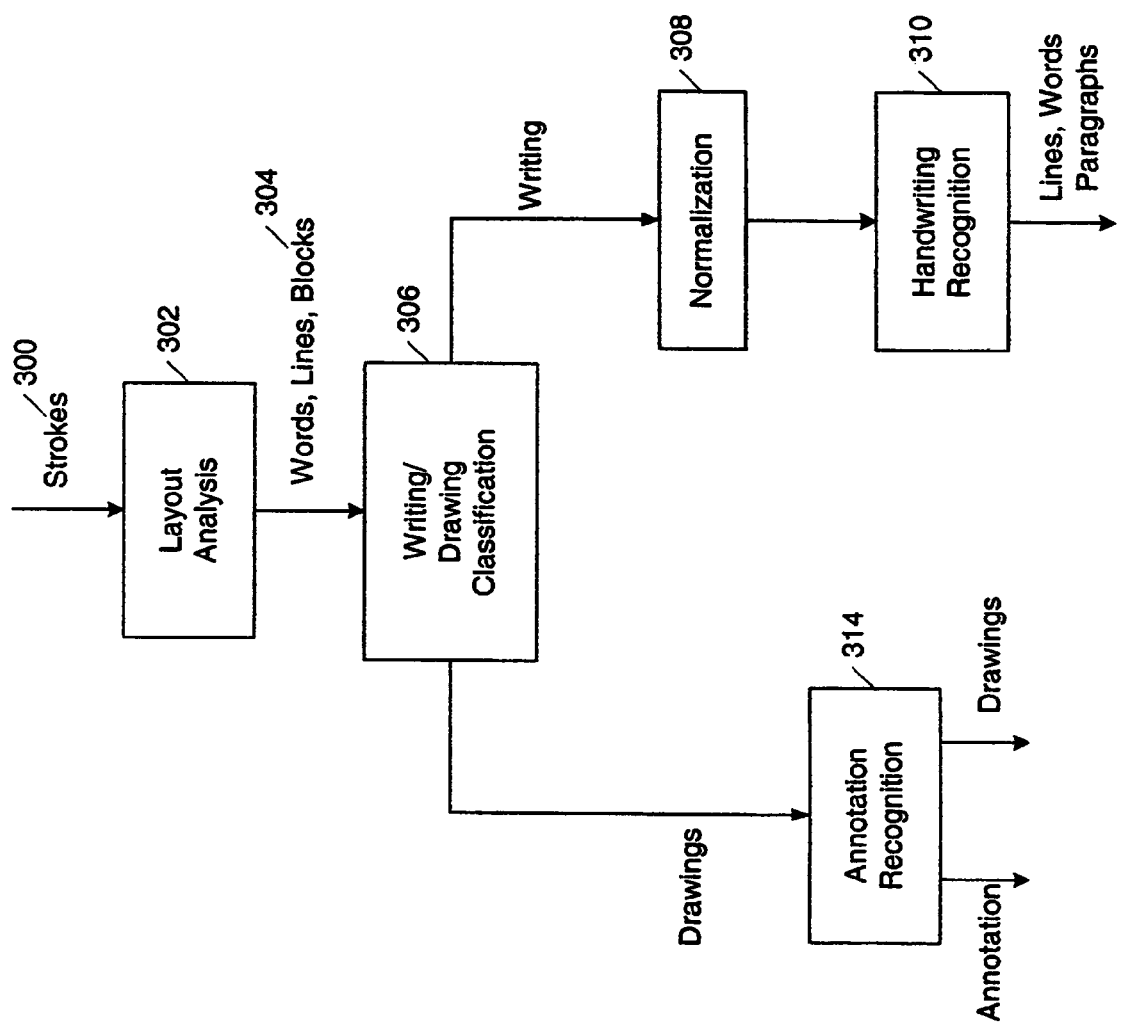
FIG. 3 illustrates an example of an overall digital ink processing system including layout analysis systems and methods according to this invention.
Figure 4:
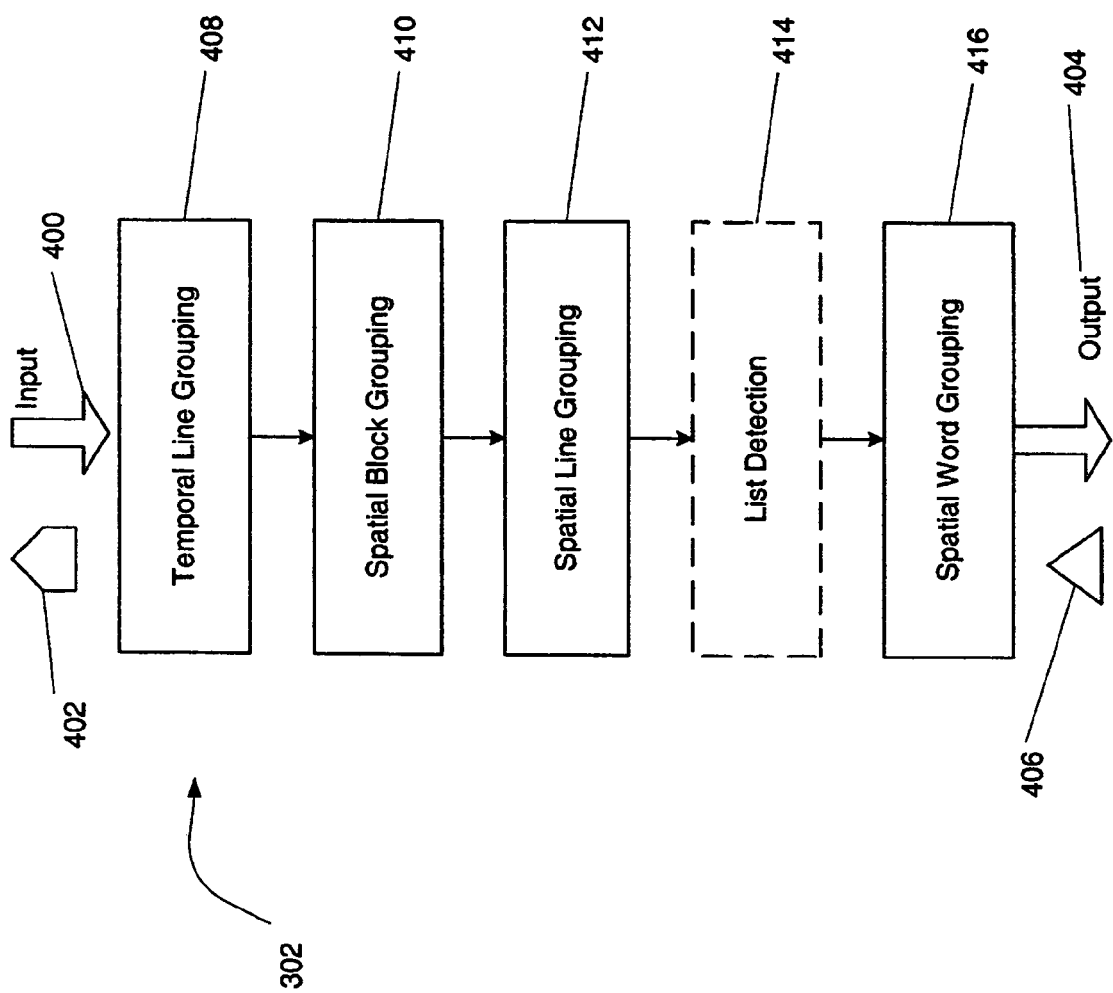
FIG. 4 illustrates a general example of various procedures or parse engines present in some examples of layout analysis systems and methods according to the invention.
Figure 13:
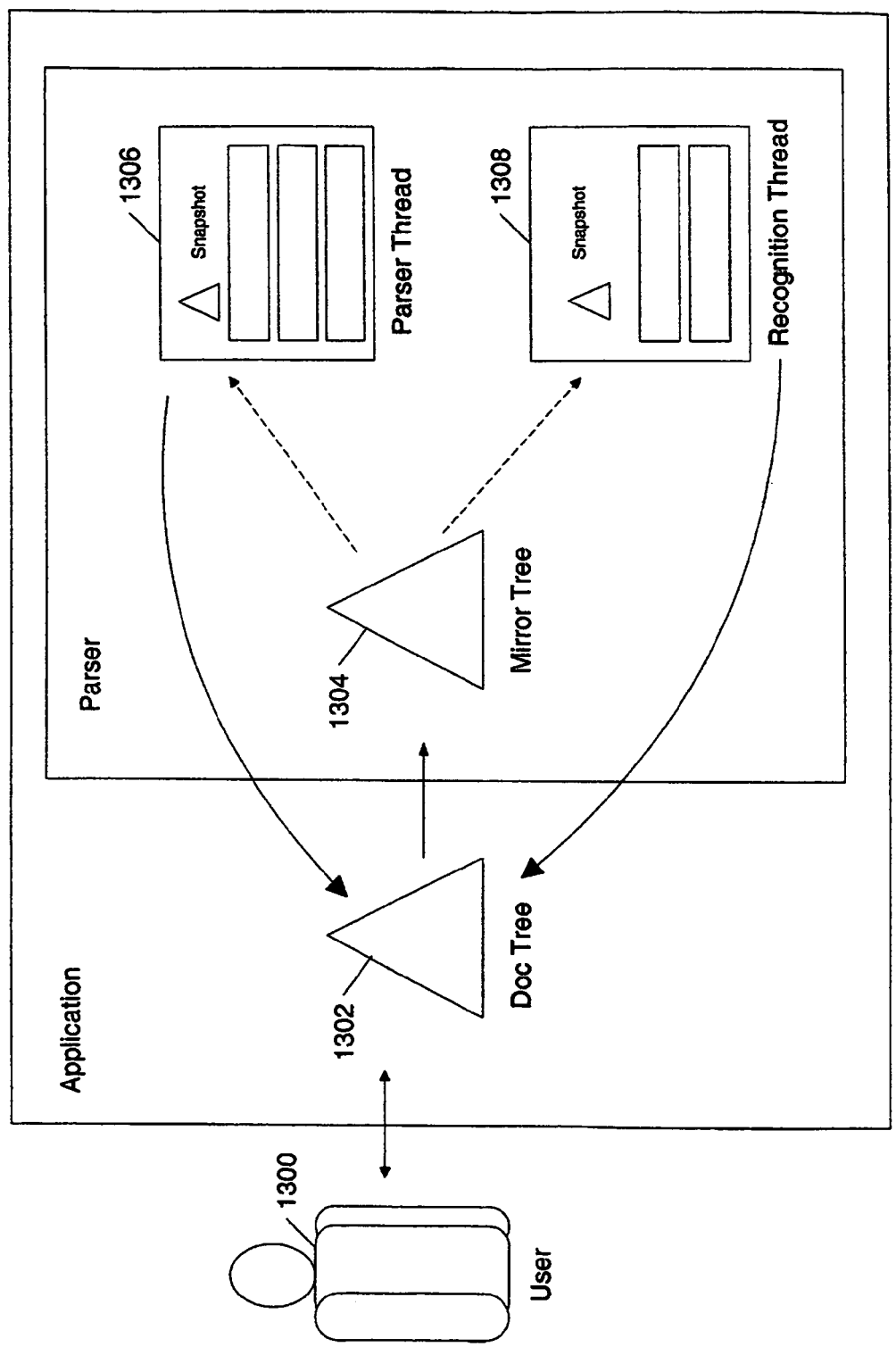
FIG. 13 illustrates a schematic diagram of an example of a system useful in allowing the layout analysis procedure of the present invention to operate at the same time a user enters ink into a document.

This specification contains figures that schematically illustrate various methods and systems useful in practicing examples of the invention (e.g., FIGS. 3, 4, and 13). These schematic illustrations are intended to illustrate both systems and/or methods useful in accordance with the invention. Therefore, in some instances, depending on the context of the sentence, a specific element from these figures (such as layout analysis element 302, temporal line grouping element 408, and the like) may be referred to as a system (e.g., a temporal line grouping system 408), while in other instances that same element and reference number may be used in reference to a method, a procedure, a step, a parse engine, and/or the like. All of these variations (e.g., systems, methods, steps, procedures, parse engines, and the like) are intended to be included within the scope of these figures.

The following description is divided into sub-sections to assist the reader. The sub-sections include: Terms, General-Purpose Computer, Layout Analysis Overview, Layout Analysis Detailed Description, Other Features, and Conclusion.

I. Terms

The following terms are used in this specification:

Ink—A sequence or set of handwritten strokes. A sequence of strokes may include strokes in an ordered form. The sequence may be ordered in any suitable manner, such as by the time the stroke was captured and/or by where the stroke appears on a page. Other orders are possible. A set of strokes may include sequences of strokes or unordered strokes or any combination thereof.

Stroke—A sequence or set of captured points. A stroke may be determined in a number of ways, for example, using time (e.g., a stroke is all points encountered by the stylus during a predetermined time interval), using a predetermined number of points (e.g., a stroke is all points 1 through X where X predefined), or using stylus contact with the digitizer surface (e.g., a stroke is all points encountered by the stylus between a pen down event and a pen up event). When rendered, the sequence of points may be connected with lines. Alternatively, a stroke may be represented as a point and a vector in the direction of the next point. Further, a stroke may be referred to as a simple list (or array or table) of points. In short, a stroke is intended to encompass any representation of points or segments relating to ink, irrespective of the underlying representation of points and/or what connects the points.

Point—Information defining a location in space. For example, a point may be defined relative to a capturing space (for example, points on a digitizer) and/or a display space (the points or pixels of a display device). Points may be represented using a variety of known techniques including two dimensional Cartesian coordinates (X, Y), polar coordinates (r, Θ), three dimensional coordinates ((X, Y, Z), (r, Θ, ρ), (X, Y, t (where t is time)), (r, Θ, t)), four dimensional coordinates ((X, Y, Z, t) and (r, Θ, ρ, t)), and other techniques as known in the art.

Render—The process of determining how graphics (and/or ink) are to be displayed, whether on a screen or printed.

Figure 5B:
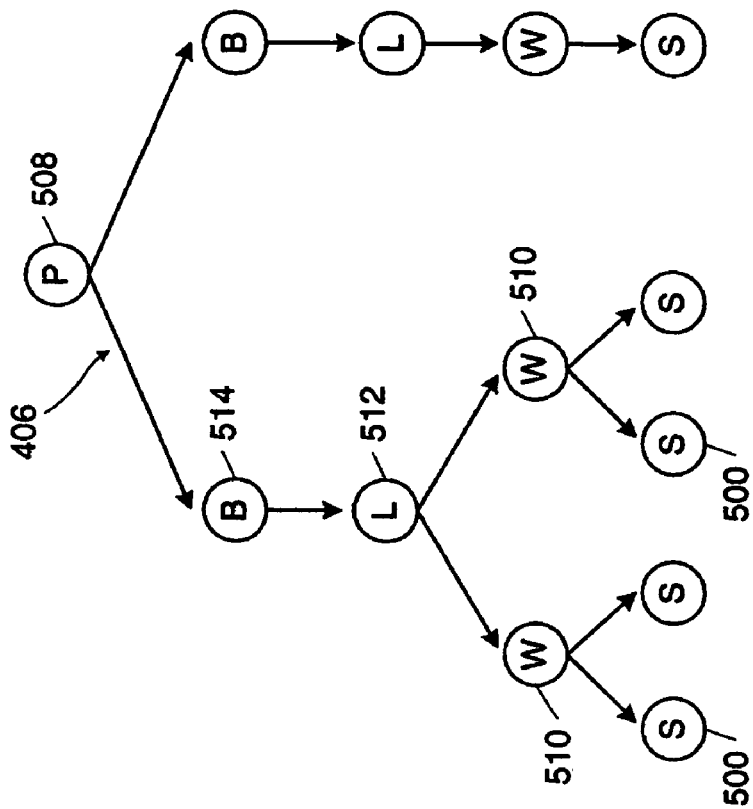
FIGS. 5A and 5B illustrate examples of parse trees describing input data used by and output data generated by layout analysis systems and methods according to the invention.
Figure 5A:
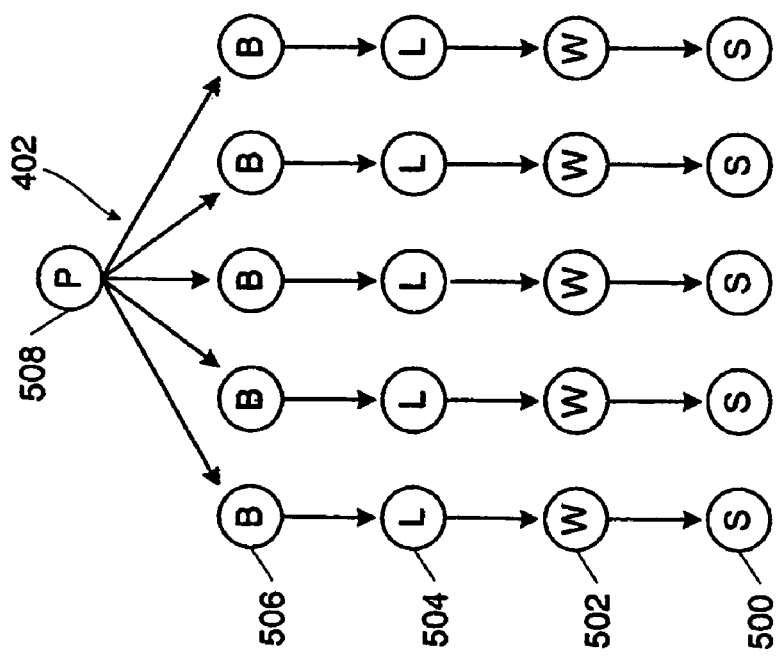

Parse Tree—A data structure representing the structure of a document. FIGS. 5A and 5B illustrate examples of parse trees, both before and after a layout analysis procedure, wherein a given page of a document is parsed into blocks, lines, words, and individual strokes.

Parse engine—A single processing step in an ink analysis engine. A typical ink analysis engine contains several parse engines, each focusing on a particular task. One example of an ink analysis engine is the layout analysis engine described herein, which may include individual parse engines for temporal line grouping, spatial block grouping, spatial line grouping, list detection, and spatial word grouping. A parse engine takes a parse tree as input and modifies it (if appropriate) to produce a parse tree with a different structure, which in turn may be passed along as input to the next parse engine.

II. General-purpose Computer

Figure 1:
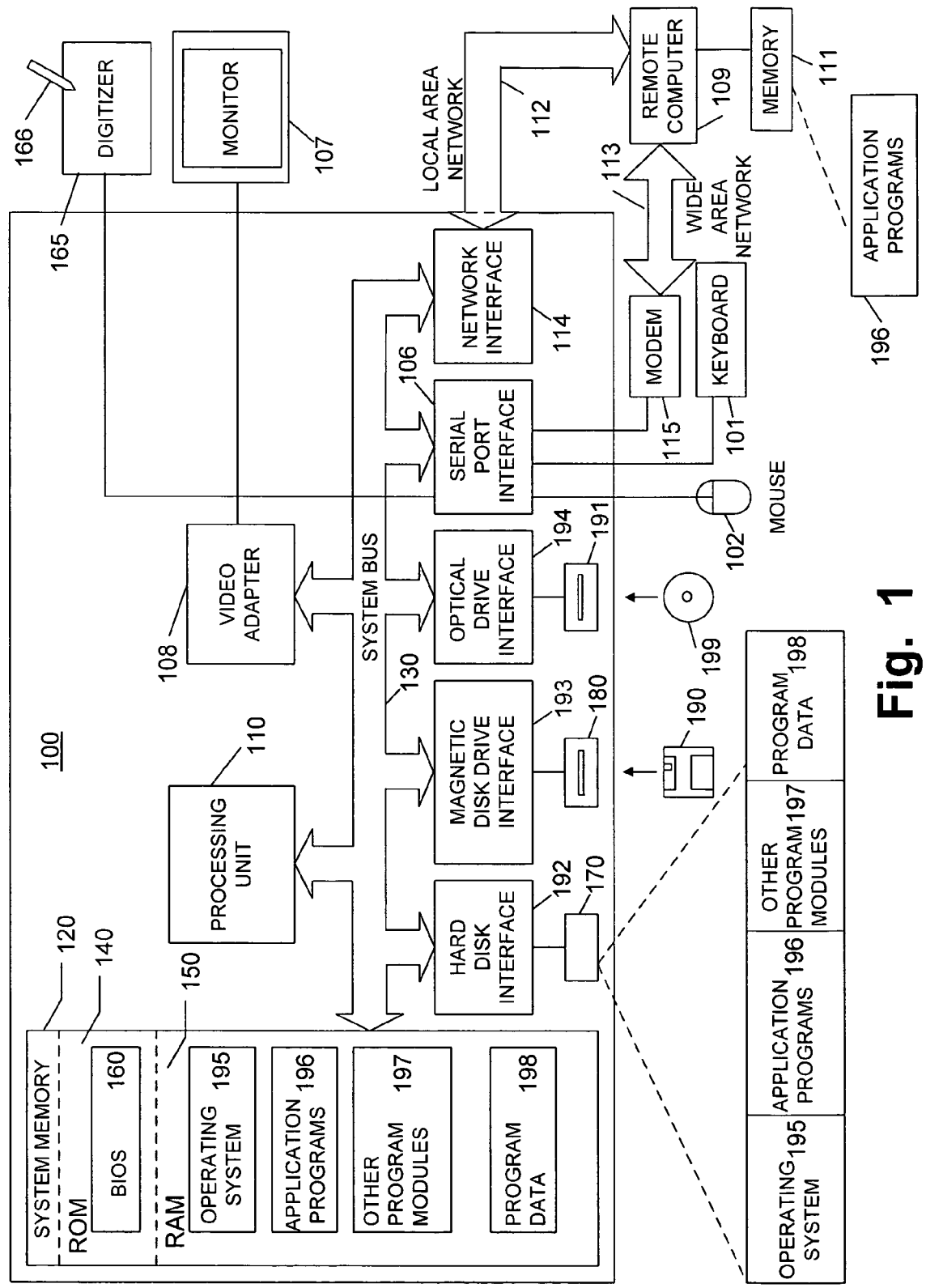
FIG. 1 illustrates a schematic diagram of an exemplary general-purpose digital computing environment that may be used to implement various aspects of the present invention.

FIG. 1 illustrates a schematic diagram of an exemplary conventional general-purpose digital computing environment that may be used to implement various aspects of the present invention. In FIG. 1, a computer 100 includes a processing unit or system 10, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 199, ROM 140, or RAM 150, including an operating system 195, one or more application programs 196, other program modules 197, and program data 198. A user may enter commands and information into the computer 100 through input devices, such as a keyboard 101 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers.

As one example, a pen digitizer 165 and accompanying pen or user input device 166 are provided in order to digitally capture freehand input. The pen digitizer 165 may be coupled to the processing unit 110 via the serial port interface 106 and the system bus 130, as shown in FIG. 1, or through any other suitable connection. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Figure 2:
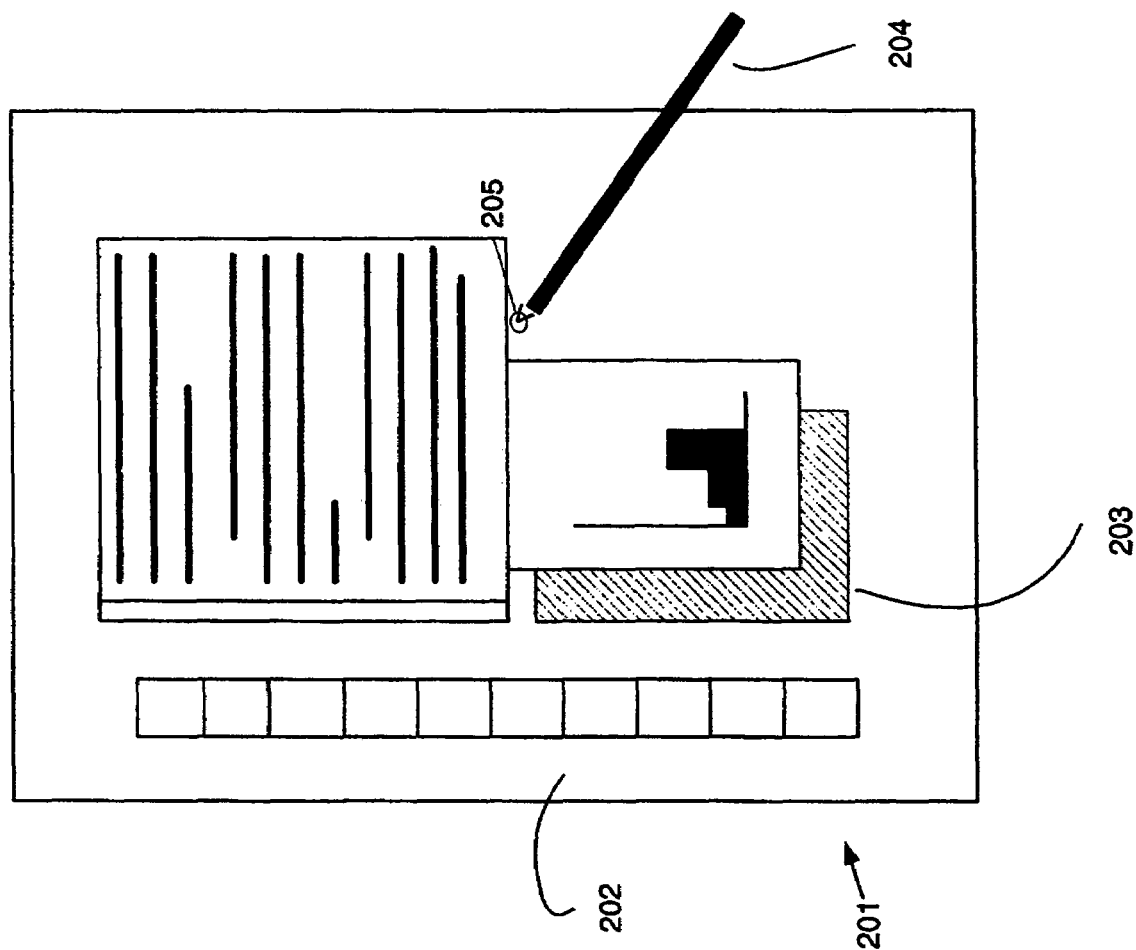
FIG. 2 illustrates an exemplary pen-based computing system that may be used in accordance with various aspects of the present invention.

FIG. 2 illustrates an exemplary pen-based computing system 201 that may be used in accordance with various aspects of the present invention. Any or all of the features, subsystems, and functions in the system of FIG. 1 may be included in the computer of FIG. 2. Pen-based computing system 201 includes a large display surface 202, e.g., a digitizing flat panel display, such as a liquid crystal display (LCD) screen, on which a plurality of windows 203 is displayed. Using stylus 204, a user may select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Pen-based computing system 201 interprets gestures made using stylus 204 in order to manipulate data, enter text, create drawings, and/or execute conventional computer application tasks, such as spreadsheets, word processing programs, and the like.

The stylus 204 may be equipped with one or more buttons or other features to augment its selection capabilities. In one example, the stylus 204 may be implemented as a "pencil" or "pen," in which one end constitutes a writing element and the other end constitutes an "eraser" end, and which, when moved across the display, indicates portions of the display to be erased. Other types of input devices, such as a mouse, trackball, or the like also may be used. Additionally, a user's own finger may be the stylus 204 and used for selecting or indicating portions of the displayed image on a touch-sensitive or proximity-sensitive display. Consequently, the term "user input device," as used herein, is intended to have a broad definition and encompasses many variations on well-known input devices, such as the stylus 204. Region 205 shows a feedback region or contact region permitting the user to determine where the stylus 204 contacted the display surface 202.

A layout analysis process or system according to this invention may be used with pen-based computing systems, like those described above in conjunction with FIG. 2.

III. Layout Analysis Overview

The present invention relates to systems and methods for analyzing digital ink input, e.g., in a pen-based computing environment. FIG. 3 is a diagram that schematically illustrates a general overview of the environment in which systems and methods according to some examples of this invention may be used. In general, incoming or input strokes 300 first are subjected to a layout analysis procedure 302, which combines and parses the individual strokes into associated words, lines, and/or blocks 304. The following description focuses primarily on the steps and systems involved in performing this layout analysis procedure 302.

In general, the layout analysis engine and procedure 302 according to at least some examples of this invention is a multi-pass, bottom-up procedure. The layout analysis procedure 302 may include a succession of decisions based on the ink layout and statistics. These decisions yield a hierarchical clustering of ink strokes on the page, which allow global statistic calculations over the cluster(s). The first decisions are conservative, based on local layout relationships when the clusters are small (e.g., representing individual strokes or short combinations of strokes). Later decisions can be more aggressive, due to the more global statistics collected from larger clusters (e.g., stroke sizes over a longer line, relative spacing, line angles, etc.). The multiple passes enable increasingly aggressive decision making in determining whether to merge strokes to form lines and/or blocks. The various steps used in some examples of a layout analysis procedure 302 will be described in detail below.

After the layout analysis procedure 302, the data may be introduced into a variety of different ink analysis engines for further processing. In the illustrated system of FIG. 3, the data is next introduced to a classification system or method 306 (e.g., to determine whether a set of strokes constitutes a drawing, text, music, mathematics, flow diagrams, etc.). This classification system or engine 306 determines whether individual strokes, words, lines, and/or blocks of data represent a pre-defined type, such as drawing strokes or writing strokes. Any suitable classification engine 306 may be used without departing from this invention (or, as another alternative, a user could tell the system the type of strokes included in the input data, e.g., by indicating "drawing type," "text type," or the like). Further processing of the input ink may depend on whether the strokes are determined to contain writing or textual information or drawings. For strokes that are classified as writing, the words, lines, or blocks of text may be sent to a handwriting recognition system 310. If necessary, prior to introduction into the handwriting recognition system 310, the words, lines, or blocks of text may be "normalized" using a normalization method or system 308, to place the input text in an optimum orientation for analysis by a handwriting recognition system or method 310. Conventional normalization systems or methods 308 and/or handwriting recognition systems or methods 310 may be used without departing from the invention. The data output from the handwriting recognition system or method 310 may constitute machine-generated text (e.g., lines, words, paragraphs, etc.) usable in any conventional manner, such as in conventional word processing systems (e.g., Microsoft WORD® or the like), e-mail handling systems, etc.

In the example illustrated in FIG. 3, if the classification engine 306 recognizes the input strokes as drawings, the data may then be transferred to an annotation recognition system or method 314, which can be used to recognize textual information in the drawing. Further processing can proceed in any desired or conventional manner. For example, if desired, the drawings may be "cleaned-up," wherein the handwritten annotations may be replaced with machine-generated text, handwritten drawing lines or shapes (e.g., circles, triangles, rectangles, etc.) may be replaced with machine-generated elements, and the like. Also, the drawings (either the handwritten versions or later machine-generated versions) can be introduced into any suitable programs or systems without departing from this invention.

One aspect of this description relates to layout analysis engine 302 illustrated in FIG. 3. In a pen-based computing environment, electronic ink may be introduced into the system as "strokes" (or in any other suitable manner, such as by downloading from an external source or memory). One desirable feature provided in at least some examples according to this invention allows the user free reign to write anywhere on the digitizing display surface, in any orientation, just as a user would have free reign using conventional pen and paper. In these examples of the invention, the user's input is not confined to any particular computer screen orientation, stroke size, timing, or otherwise. Moreover, the user need not advise the system in advance that he/she intends to enter textual information or drawing information (i.e., no need to preset a particular drawing or text mode).

Figure 5C:
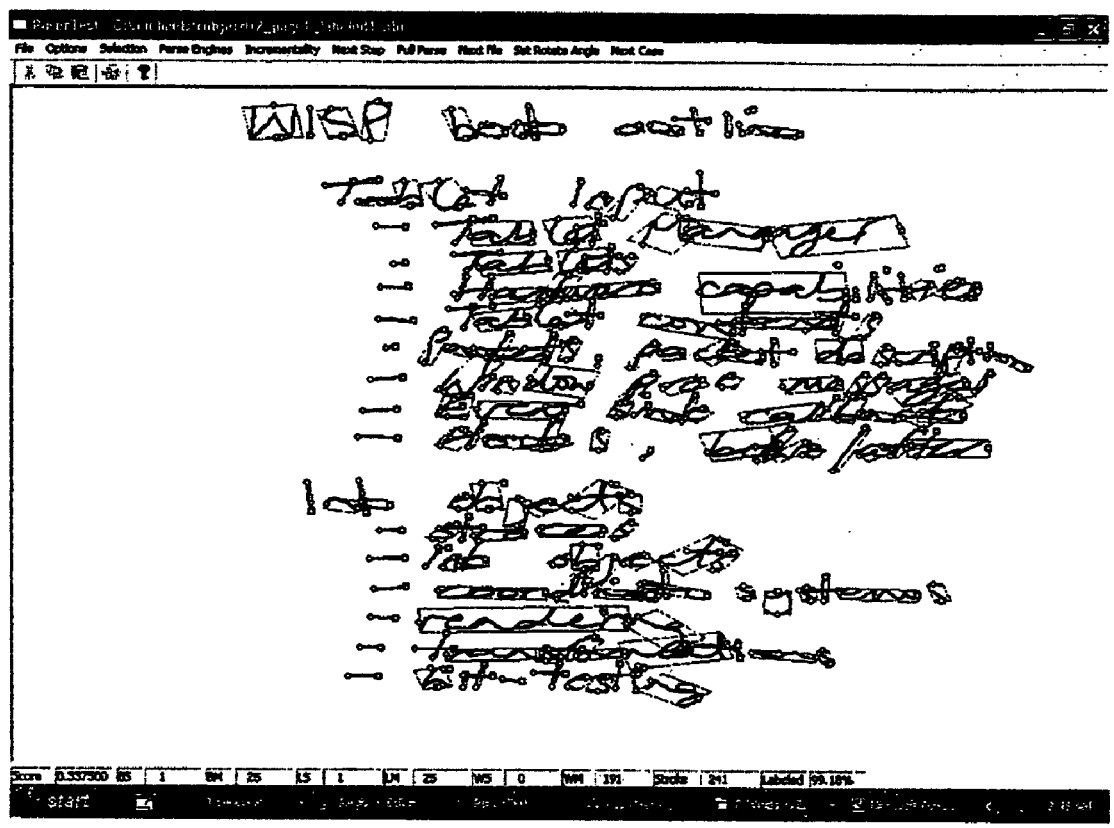
FIG. 5C illustrates a "screen shot" of an exemplary input page of ink for a layout analysis procedure according to one example of this invention.

FIG. 4 generally illustrates steps or parse engines involved in one example of a layout analysis system or method 302 useful in this invention. Because of the freedom provided to the user in inputting digital ink into the systems and methods according to these examples of the invention, when the layout analysis procedure 302 begins, the systems and methods according to the invention have no preliminary information from which to determine the desired orientation or type of input data (e.g., whether the incoming input data 400 is textual or drawing). Element 402 in FIG. 4 provides a general graphical representation of the input data structure 400, and this representation 402 is illustrated in more detail in the parse tree of FIG. 5A. In general, when the layout analysis procedure 302 begins, the systems and methods according to these examples of the invention treat every stroke S 500 on a given page P 508 as a separate word W 502, every word W 502 is treated as a separate line L 504, and every line L 504 is treated as a separate block B 506. FIG. 5C illustrates a "screen shot"

showing a page of ink input for a layout analysis engine 302 example according to the invention. Notably, as illustrated in this figure, each individual stroke (e.g., points encountered during a pen-down to a pen-up event in this example) is held independent at this stage of the layout analysis.

The layout analysis engine 302 according to this example of the invention operates greedily, such that during each pass (or operation of each parse engine) merger operations occur, but splits do not. Moreover, the engine 302 may be operated with tests and tolerances such that it will not be necessary to go back and correct an undesired merger operation.

As a result of the operation of layout analysis engine 302, the individual strokes S 500 may be combined into words W 502, lines L 504, and blocks B 506, where appropriate. FIG. 5B illustrates a graphical representation 406 of a possible parse tree data structure for the data output 404 from the layout analysis engine 302. As illustrated in FIG. 5B, the page P 508 contains the same overall stroke information, but certain strokes S 500 have been combined or joined together to form words W 510, and certain words W 510 have been joined together to form a line L 512. Of course, a word may contain any number of strokes, and likewise a line may contain any number of words. Also, although not illustrated in the particular parse tree example of FIG. 5B, two or more lines also may be joined together to form a block 514.

In addition to helping define the structure of a document, the various nodes in the parse tree (e.g., FIG. 5B) may be used to store spatial information relating to various levels in the tree. For example, each line level node may store a regression/fit line of all points that make up the strokes of the line, the convex hull of each stroke in the line, and/or any other desired information. Also, the parse tree data structures can be modified by applying various elementary operations on the strokes, words, lines, and blocks contained in it. Suitable operations may include: add, remove, merge, split, and reparent. More complex operations may be composed using these elementary operations. As these operations are performed on the data structure tree, the statistics maintained at the different node levels may be automatically updated by the system to correspond to the new structure.

While this description of the layout analysis engine 302 uses terms like "word," "line," and "block," these terms are used in this specification as a matter of convenience to refer to groups of associated strokes or stroke sets. At the time the layout analysis step 302 occurs in this example of the invention, the system does not necessarily know whether the input ink contains textual writing type strokes, drawing type strokes, or other types of strokes.

While a more detailed explanation of various exemplary parse engines and procedures follows, FIG. 4 provides a general overview of one example of a suitable layout analysis engine 302 according to the invention. In this example, a first step in the layout analysis procedure 302 is a temporal line grouping step 408, which generally compares features of temporally adjacent strokes and combines them as lines, if appropriate. Once this temporal line grouping step 408 is completed, the next step in the layout analysis procedure 302, a spatial block grouping step 410, compares these temporal line groupings and combines lines that are located close to one another as spatial blocks (other criteria also may be considered, as explained in more detail below).

The temporally grouped lines (from step 408) may be further grouped into lines, taking into consideration their spatial relationship or orientation, in a spatial line grouping step 412. This spatial line grouping step 412 need not consider the time of one stroke or line grouping compared to another stroke or line grouping, although factors in addition to the lines' spatial relationship or orientation may be taken into consideration, such as line angle, stroke size, etc. Also, the results of the spatial block grouping procedure 410 may be used as a factor in determining whether a spatial line grouping should be made between two existing temporal line groupings.

Once the spatial line groupings have been completed, the layout analysis procedure 302 according to this example of the invention may then combine individual strokes in the lines to form one or more words (spatial word grouping step 416), depending, for example, on factors like inter-stroke spacing, line orientation, stroke size, etc.

FIG. 4 also illustrates an optional parse engine or step in broken lines that may be performed in a layout analysis procedure 302. This optional step is called "list detection" 414. Often, when users write a list, they tend to write a column of numbers or letters, and then fill in the list elements. At other times, users will write out the content of the list, and then later add a column of numbers, letters, or bullet points. This list detection engine 414 detects these special circumstances and combines the number, letter, or bullet point strokes with the corresponding list element. List detection 414 is described in more detail below.

The various steps in this exemplary ink analysis procedure 302 (FIG. 4) may be changed in order or omitted without departing from the invention. For example, if desired, the spatial line grouping step 412 may take place before the spatial block grouping step 410. However, in the some examples of the invention, it is desirable to conduct the spatial block grouping step 410 prior to the spatial line grouping step 412 so that the results of the spatial block grouping step 410 can be used in the spatial line grouping analysis 412.

The output data 404 from the layout analysis engine 302 can be used in any suitable or desired manner. For example, as illustrated in FIG. 3, this data may be fed to a classification engine 306 (if necessary), and from there to other appropriate processing engines (e.g., annotation recognition systems 314, handwriting recognition systems 310, etc.).

IV. Layout Analysis Detailed Description

This portion of the specification describes the procedures or parse engines generally illustrated in FIG. 4 in more detail, namely, the temporal line grouping engine 408, the spatial block grouping engine 410, the spatial line grouping engine 412, the list detection engine 414, and the spatial word grouping engine 416.

A. Temporal Line Grouping

The first parse engine in this example of the layout analysis engine 302 merges together temporally consecutive strokes to thereby form temporal line groupings (step 408 of FIG. 4). The temporal line grouping procedure 408 takes advantage of various features that are quite typical of handwritten text. In general, people write associated text words or lines in relatively straight lines (although not necessarily horizontally on a page), and the characters are generally about the same size or within a certain size range. Additionally, people typically write from left to right across a page such that many strokes lie to the immediate right of the immediately preceding stroke (of course, this parameter may differ for writing that rasters in different directions, such as up and down, right to left, etc., and such differences remain within the scope of this invention). While not all strokes follow this time ordered sequence, particularly when a person is quickly taking notes, an initial grouping based on temporally consecutive strokes can be used to accurately group together at least some strokes as belonging to a common line. Thus, in general, the temporal line grouping procedure 408 in this example of the invention groups together temporally adjacent strokes, if the strokes are of similar size and relatively close together. This temporal line grouping procedure 408 can provide information to assist in making later, larger groupings based on spatial relationships.

The temporal line grouping procedure 408 in some examples of the invention may be implemented in two phases. The first phase in this example may be very conservative, only grouping together temporally adjacent or consecutive strokes as belonging to a common line when the strokes very clearly belong together on the same line (e.g., strokes that are relatively close to one another). The result of this first conservative phase, which also is called an "initial temporal line grouping" in this specification, may then be used in the second phase of the temporal line grouping procedure 408 to provide more complete or detailed information about the orientation of lines. The second phase can then act more aggressively, evaluating initial temporal line groupings that are consecutive in time, and grouping together those having the same general stroke size and initial temporal line grouping angle orientation (at least for longer initial temporal line groupings). The line groupings resulting from this second phase also are referred to as "final temporal line groupings" in this specification.

1. Initial Temporal Line Grouping

Figure 6:
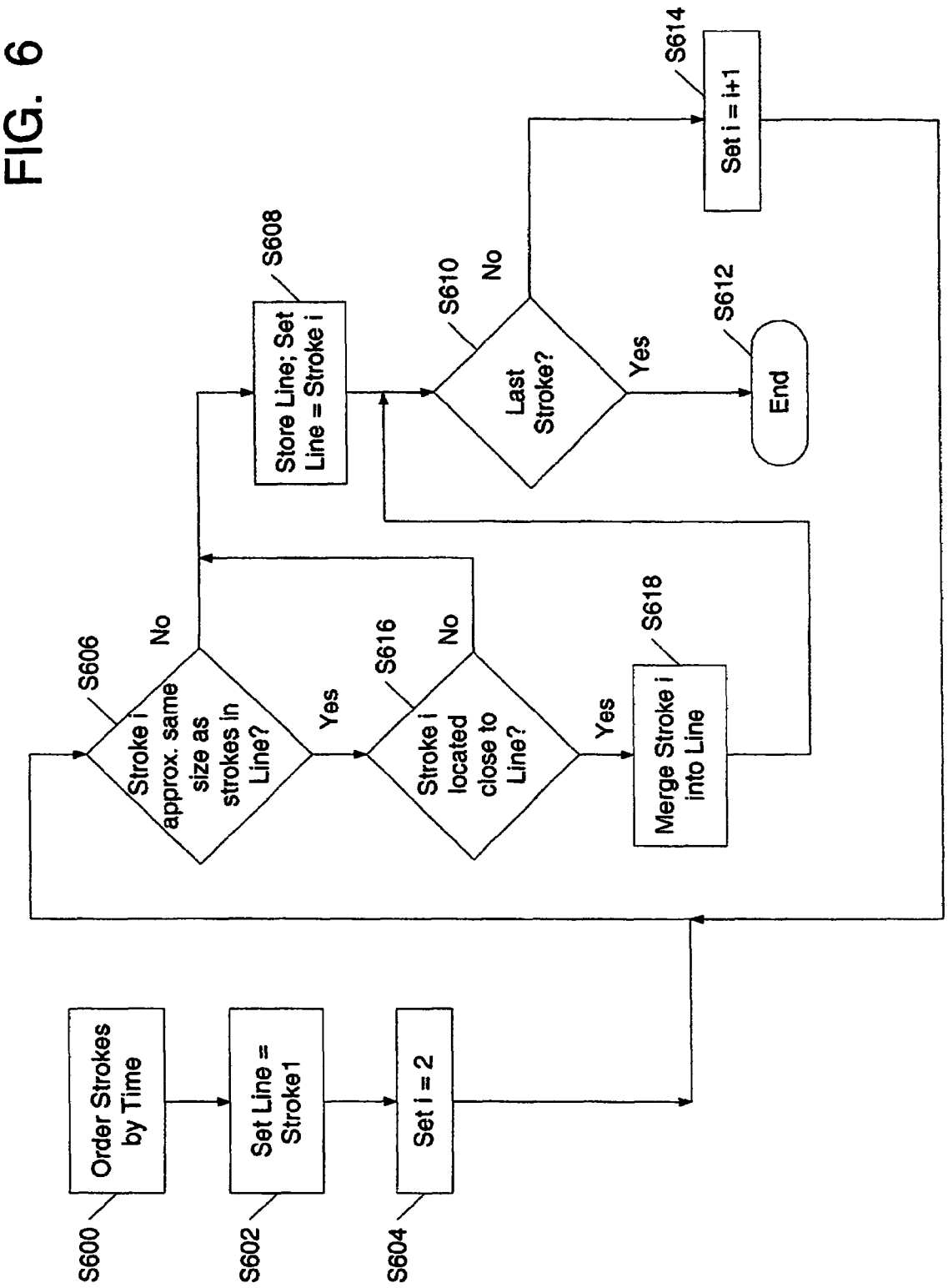
FIG. 6 illustrates an exemplary flow diagram of a portion of a temporal line grouping procedure or parse engine useful in some examples of the layout analysis procedure of the present invention.

FIG. 6 illustrates an example of a flow diagram or algorithm for the first phase of a temporal line grouping procedure 408 according to one example of this invention (i.e., a procedure for merging individual consecutive strokes into initial temporal line groupings). First, strokes on a page are arranged in order by time (Step S600). Each stroke on the page (strokes 1 through i) is compared to the next stroke in time: As strokes are merged or combined together, the system builds initial temporal line groupings including temporally adjacent strokes when the strokes meet the requirements for merger. When this procedure is completed, all strokes are associated with an initial temporal line grouping, although some initial temporal line groupings may contain a single stroke.

In the procedure, because the Line content (i.e., the initial temporal line grouping) is initially empty when the procedure starts, the first initial temporal line grouping Line is set equal to the first stroke (Step S602). The first stroke must then be compared with its temporally adjacent stroke (Stroke S2). To do so, the stroke counter i is set to the second stroke (Step S604, i=2). The system then determines whether Stroke 1 (Stroke 2 in this first iteration) is within a predetermined size range of the strokes already present in the Line (Stroke I in this first iteration; Step S606). If Stroke i is much larger and/or smaller than the strokes present in the Line (answer NO), the system determines that Stroke i should not be merged with the Line. In this instance, the content of the Line is saved as one initial temporal line grouping and a new temporal line grouping is started using the content of Stroke i as the initial content of the new Line (Step S608). At Step S610, the system determines whether Stroke i is the last stroke to be evaluated, and if so (Answer Yes), the procedure ends (S612). If there are more strokes to evaluate at Step S610 (Answer No), the stroke counter i is incremented by one (Step S614), and the procedure returns to Step S606.

If Stroke i is within a predetermined size range of the other strokes in the Line at Step S606 (Answer Yes), the system then determines whether Stroke i is located within a predetermined range of another stroke in the Line (Step S616). If no, the system judges that Stroke i should not be merged with the present Line. Again, the content of the Line is saved as an initial temporal line grouping and a new temporal line grouping is started using the content of Stroke i as the initial content of the new Line (Step S608), and the procedure proceeds through Steps S610, S612, and S614, as appropriate.

If Stroke i is located within a predetermined range of another stroke in the Line in Step S616 (Answer Yes), the system then judges that Stroke i should be merged with the Line and the merger occurs (Step S618). The procedure then determines if additional strokes remain to be checked (Step S610), and performs the additional steps, as appropriate. The procedure repeats until it reaches the last stroke in time, where it ends (Step S612). The initial temporal line groupings stored as a result of this procedure are available for further processing.

Of course, many variations in this procedure for obtaining initial temporal line groupings may be used without departing from the invention. For example, the system could check strokes backward in time, forward in time, from longest to shortest, or in any desired order. As another example of a possible variation, a user can use any appropriate test to determine whether a new stroke (Stroke i) is located close to the Line in Step S616. In this example, because the initial temporal line grouping procedure is the very first step in the layout analysis procedure, the initial temporal line grouping procedure is very conservative in determining whether a merger should occur. Therefore, in this example, a new stroke must be located very close to an existing stroke in the Line before the system will allow the merger.

2. Stroke Fragments

The systems and methods according to various examples of the invention also may use a variety of different parameters to determine whether a new stroke is within a predetermined size range of stroke(s) in an existing Line in Step S606. As one example, in order to improve the statistics available to characterize size of a stroke and a line, an individual stroke, in some instances, may be broken into a plurality of "stroke fragments."

Figure 8A:
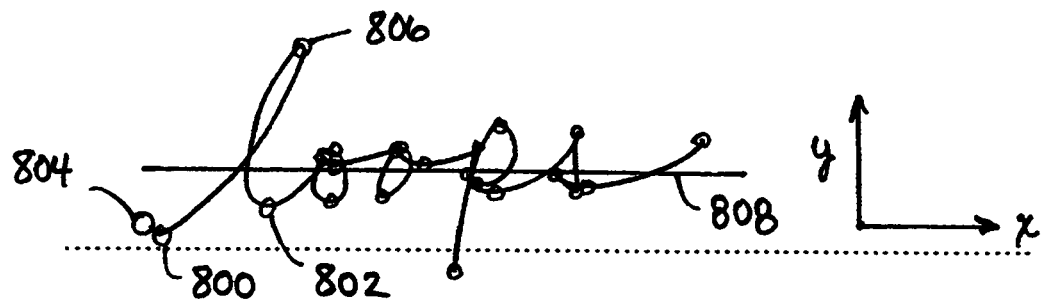
FIGS. 8A and 8B illustrate local minima and maxima that assist in defining stroke fragments used in some examples of processing steps of the present invention.

FIG. 8A illustrates one example of breaking a single long stroke (the cursive word "loops") into several stroke fragments. Handwriting (both printing and cursive) generally contains relatively loopy strokes. Therefore, a handwritten stroke often can be broken into a series of stroke fragments by breaking the stroke at its cusps and/or local minimum and maximum points with respect to any fixed coordinate system (e.g., fixed X and Y coordinates of a pen-based computer digitizing screen). As shown in FIG. 8A, the first letter "l" of the word "loops" contains two local minima (points 800 and 802) and two local maxima (points 804 and 806). Each remaining letter in the word "loops" also contains several minimum and maximum points, as illustrated. By breaking each stroke into its stroke fragments, one can characterize the "stroke size" of any specific stroke in any number of ways, such as using an average stroke fragment height, average stroke fragment width, median stroke fragment height, median stroke fragment width, etc. Similarly, an entire line of ink data can be characterized by its average stroke fragment height and/or width, median stroke fragment height and/or width, etc. Thus, when performing Step S606 in FIG. 6, one could compare the average or median stroke fragment size of Stroke i with the average or median stroke fragment size of the existing Line. Additionally, when new Strokes are merged into the Line, the average or median stroke fragment size over the new line can be recalculated to provide an even more comprehensive sample. By using stroke fragments as compared to an overall width or height of an entire stroke, more comprehensive statistics are available for determining stroke size.

Figure 8B:
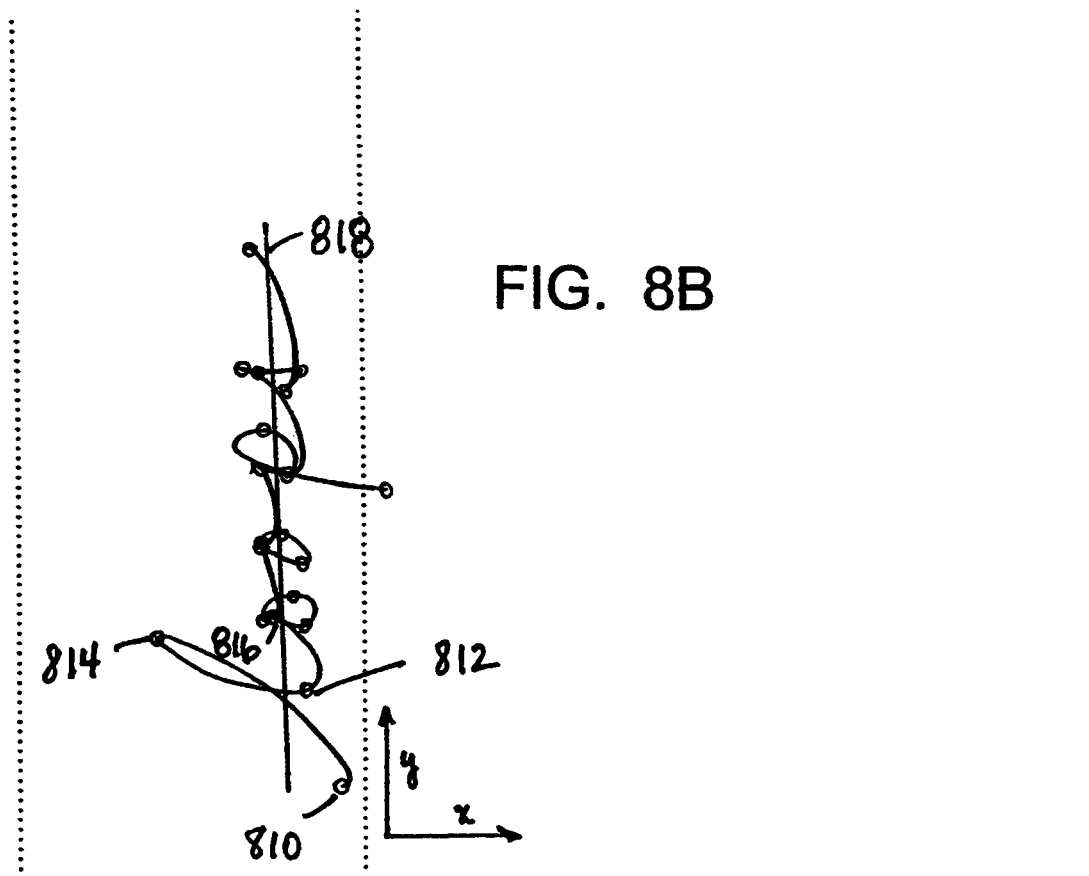

One convenient aspect of using stroke fragments as a tool for characterizing stroke size relates to the fact that orientation of the writing on the page template does not matter. FIG. 8B shows the same word "loops" as present in FIG. 8A, but in this instance the word is oriented as if the user wrote it essentially vertically on the page. Using the same fixed X-Y coordinate system as shown in FIG. 8A, however, cusps and local minima and maxima still can be located in the word "loops," as shown in FIG. 8B, although because the word is oriented differently, the local minima (810 and 812) and maxima (814 and 816) differ from those in FIG. 8A. These local minima and maxima, however, still may be used to calculate stroke size (e.g., stroke fragment height or width and/or average stroke fragment height or width) in the same manner as described above in conjunction with FIG. 8A.

Of course, other features of a stroke may be used for determining a stroke fragment without departing from the invention. For example, rather than using local minima and maxima, local leftmost and rightmost points could be used. As another alternative, the strokes could be broken at fixed locations along the page template to provide information relating to the stroke size. These and other suitable alternatives fall within the scope of the term "stroke size" as used in this specification.

3. Final Temporal Line Grouping

The initial temporal line grouping procedure in this example of the invention groups strokes into lines based on time and relative location (other factors also may be used, considered, or evaluated). While this temporal line grouping alone may be satisfactory to proceed with the next steps of the procedure illustrated in FIG. 4, some examples of the invention may include a second phase in the temporal line grouping procedure 408. This second phase may be used, at least in some cases, to further group temporally adjacent line groupings or strokes into larger final temporal line groupings.

In conducting the procedure of FIG. 6, each initial temporal line grouping may be assigned a time, which may, for example, correspond to the earliest stroke in the grouping, the latest stroke in the grouping, etc. Then, as one example, a procedure like that illustrated in FIGS. 7A and 7B may be used to further group the line groupings into final temporal line groupings.

Figure 7A:
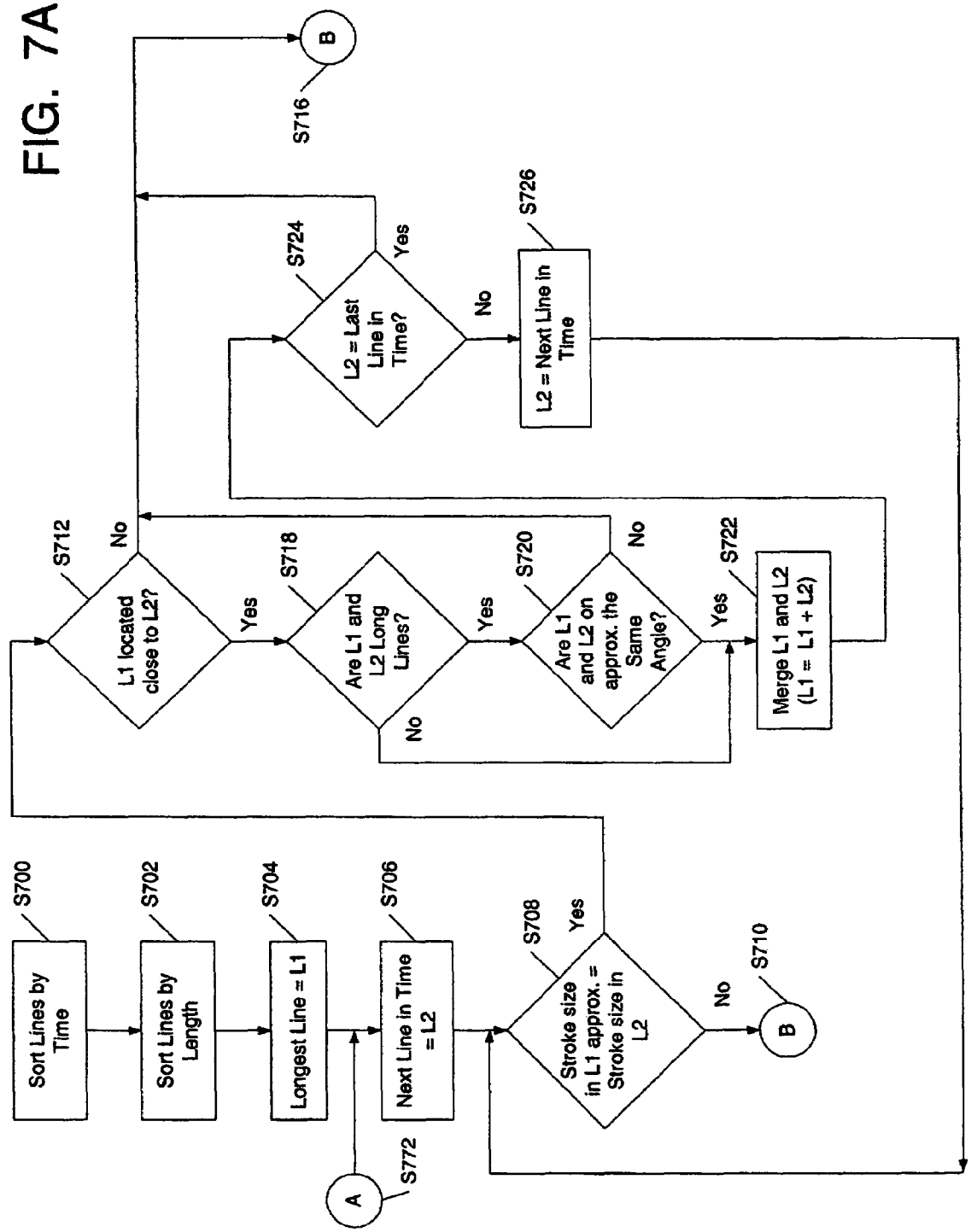
FIGS. 7A and 7B illustrate an exemplary flow diagram of another portion of a temporal line grouping procedure or parse engine useful in some examples of the layout analysis procedure of the present invention.

In the procedure of FIG. 7A, the initial temporal line groupings produced above are sorted by time (Step S700) and by overall length (Step S702). Because this procedure is still a temporal line grouping procedure, it still seeks to group lines that are adjacent in time. However, taking advantage of the more complete statistics available as a result of the initial temporal line grouping conducted as shown in FIG. 6, the systems and methods according to this example of the invention evaluate the initial temporal line groupings from the longest line grouping to the shortest line grouping (longer line groupings typically have more stroke fragments and therefore, a larger sample size in determining average or median stroke fragment size). These line groupings are compared and grouped with their respective neighbors in time (both forward and backward in time), if appropriate, until the procedure determines that further grouping is not appropriate.

Accordingly, in Step S704, the longest initial temporal line grouping is set as L1, and the next initial temporal line grouping in time is set as L2 (Step S706). Initially, the procedure determines whether the stroke size in L2 is within a predetermined range of the stroke size in L1 (Step S708). Any appropriate manner for comparing stroke size can be used, such as through the use of stroke fragments as discussed above. If the stroke sizes are not within a predetermined range (Answer NO in Step S708), the system determines that L1 and L2 are not good candidates for merger at this time, and the procedure is transferred over to its second half (where the previous line in time is checked against L1, see FIG. 7B), as indicated by transfer bullet B (Step S710).

If the stroke sizes in L1 and L2 are within a predetermined range (Answer YES in Step S708), the procedure then determines whether L2 is located within a predetermined distance from L1 (Step S712). If NO, the system again determines that L1 and L2 are not good candidates for merger at this time, and the procedure moves to its second half (FIG. 7B), as indicated by transfer bullet B (Step S716).

If it is determined that L2 is located sufficiently close to L1 at Step S712, then L1 and L2 are possible candidates for merger. If both L1 and L2 are "long lines" (greater than some predetermined length or containing more than some predetermined number of stroke fragments (e.g., more than seven stroke fragments)) (Answer YES at Step S718), the procedure then determines whether L1 and L2 lie on angles within a predetermined range (Step S720). If NO, the system determines that L1 and L2 are not appropriate candidates for merger (users do not typically intend for two portions of the same line to be oriented in different directions), and the procedure moves to the second half (Step S716).

If both L1 and L2 are not long lines (Answer NO at Step S718), the procedure deems at least one initial temporal line grouping as too short to obtain accurate angular information, and the two line groupings are merged (Step S722). Optionally, if desired, the two initial line groupings may be required to satisfy a tighter proximity requirement to allow merger than would be the case for longer lines (e.g., Step S712 could be repeated using a tighter tolerance). Also, if both L1 and L2 are long lines (YES at Step S718) and both extend at approximately the same angle (within a predetermined angular range) (YES at Step S720), the two line groupings L1 and L2 are merged (Step S722).

Once merger has occurred at Step S722, the system then determines whether L2 is the last line in time (Step S724). If YES, the procedure moves to its second half (Step S716). If L2 is not the last line in time (Answer NO at Step S724), L2 is changed to correspond to the next line in time (Step S726), and the procedure repeats, beginning from Step S708 (notably, L1 also has changed to include the content of the previous L2).

Figure 7B:
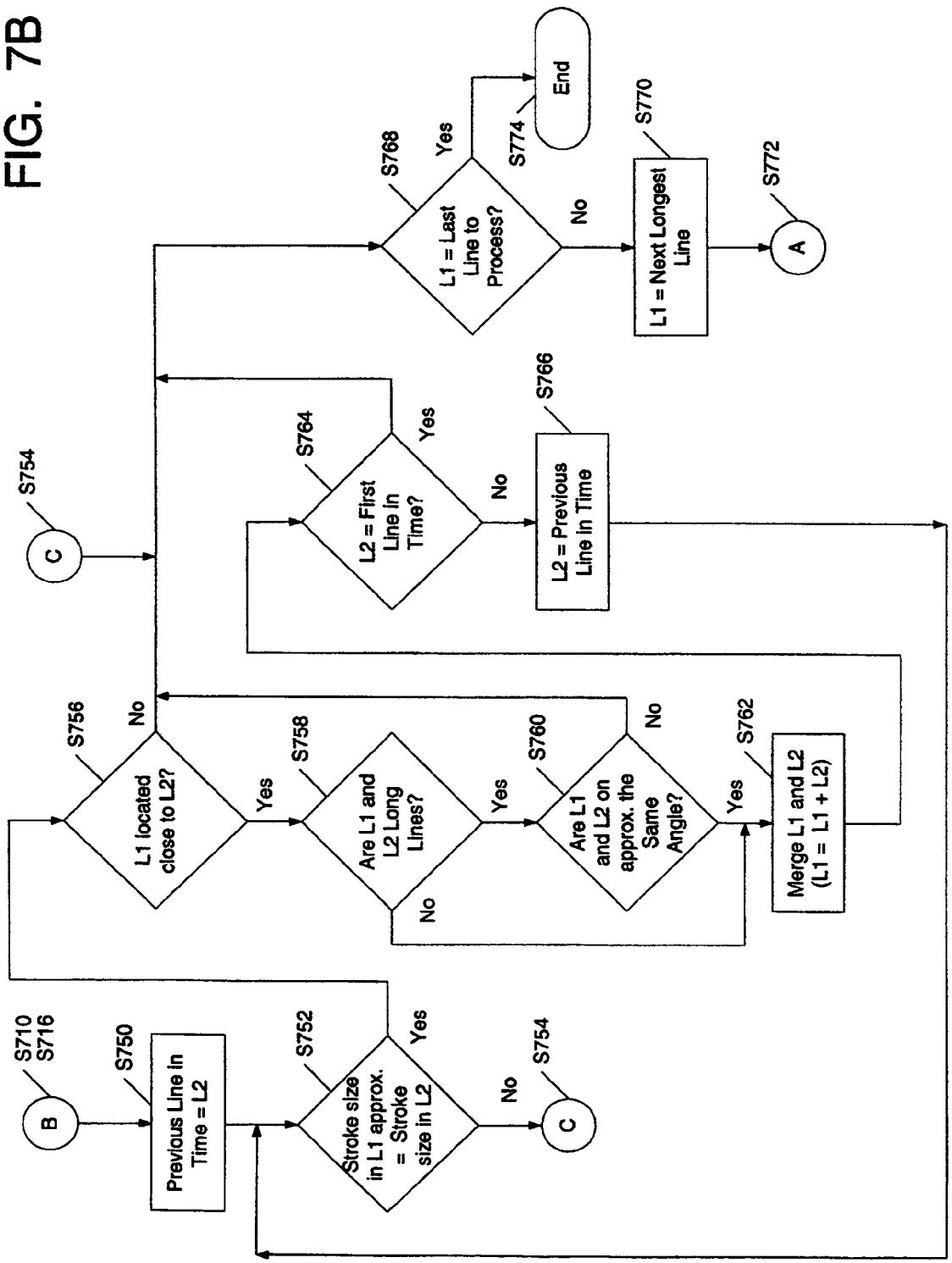

The second half of this phase of the temporal line grouping procedure, illustrated in FIG. 7B, is similar to that shown in FIG. 7A, but the second half checks the line grouping L1 against the previous line groupings in time. The procedure transfers to FIG. 7B from either of Steps S710 or S716 in FIG. 7A. Once there, the procedure compares L1 from FIG. 7A (including any or all merged line groupings) with the previous lines in time. First, L2 is set equal to the line grouping previous to L1 in time at Step S750. At S752, the procedure determines whether the stroke size in L2 is within a predetermined size range of the stroke size in L1. If NO, the line groupings are not good candidates for merger, and the procedure moves on, as will be described in more detail below, and as shown by transfer bullet C (Step S754).

If L1 and L2 contain strokes within a predetermined size range, the procedure then determines whether L2 is located within a predetermined range of L1 (Step S756). If YES, the procedure determines whether L1 and L2 are long lines (Step S758), and if YES, whether the lines extend within a predetermined angular range (Step S760). If YES at Step S760 or NO at Step S758, L1 and L2 are determined to be good candidates for merger, and they are merged (Step S762). Steps S756, S758, S760, and S762 of FIG. 7B correspond to Steps S712, S718, S720, and S722, respectively, of FIG. 7A.

As noted above, if desired, tighter tolerances may be used before merger is allowed based on a NO answer at Step S758 (because at least one line may be too short to provide accurate angular information).

If merger is accomplished (Step S762), the procedure then determines whether L2 is the first line in time (Step S764). If NO, L2 is changed to the next previous line in time (Step S766), and the procedure returns to Step S752.

When processing between line groupings L1 and L2 is completed (e.g., by a NO answer at Steps S752, S756, or S760 or a YES answer at Step S764, the procedure then determines whether L1 is the last line to process (Step S768). If NO, L1 is changed to correspond to the next longest line (Step S770) and the procedure returns to Step S706 (transfer bullet A at Step S772). If L1 is the last line to process (Answer YES at Step S768), any ungrouped L2 is stored as a separate temporal line grouping and the procedure terminates (Step S774).

Figure 7C:
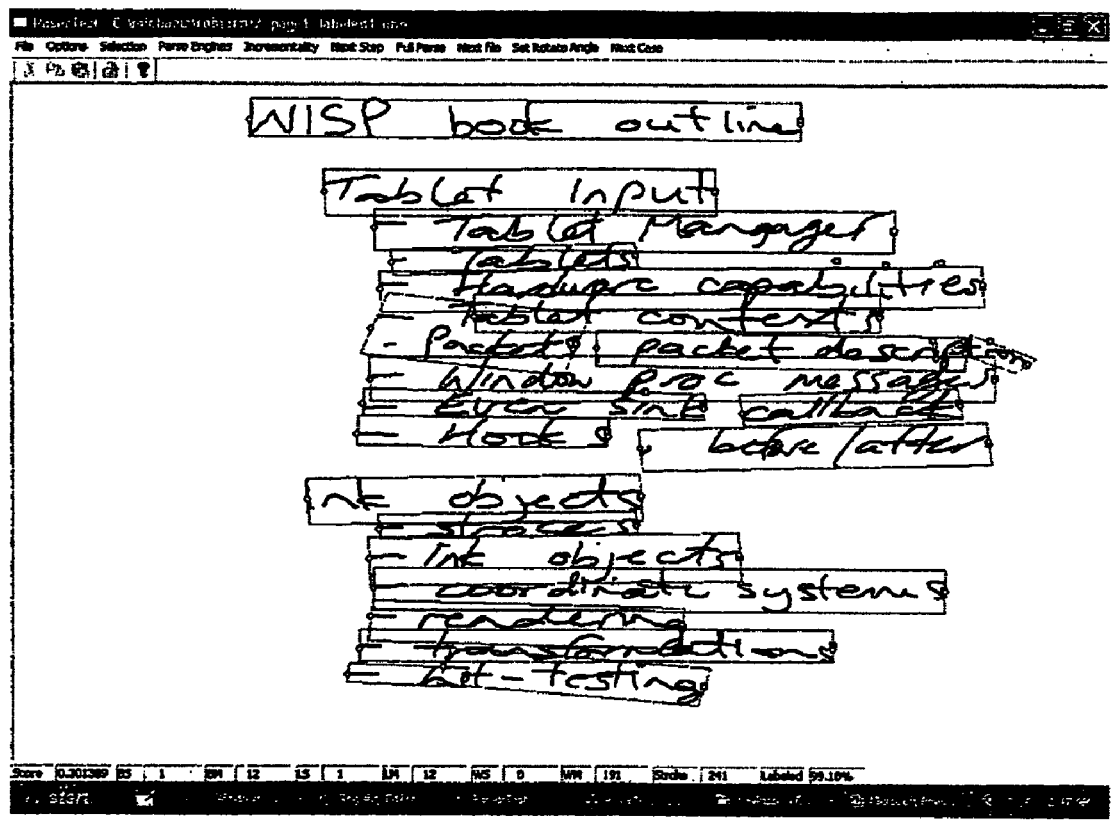
FIG. 7C illustrates an exemplary "screen shot" of a page of ink after operation of the temporal line grouping parse engine according to one example of the invention.

FIG. 7C shows an exemplary "screen shot" of a page of ink after the temporal line grouping has been completed according to one example of the invention. A comparison with FIG. 5C (the screen shot of the input data) illustrates the groupings made as a result of processing by the temporal line grouping parse engine 408 according to this example. Notably, this engine grouped temporally consecutive strokes provided they were physically located close together and on the same line or angular orientation. Because of the relative conservativeness of this initial parse engine, some groups of strokes, while located on the same line, did not get grouped together by this parse engine, either because the strokes were too far apart or because they lay at a different angle.

As is readily apparent, the procedure of FIGS. 7A and 7B can be altered in many ways without departing from the invention. For example, the order of various steps can be changed without departing from the invention. Also, if desired, once a line grouping (L2) has been merged with another line grouping (L1), the original merged line grouping (L2) could be removed from the pool of line groupings available for processing. Additionally, various different tests could be applied to determine whether two line groupings should be merged without departing from the invention. The tests described in conjunction with FIGS. 7A and 7B are merely exemplary.

Steps S720 and S760 described above involve a determination of whether temporal line groupings L1 and L2 fall within a predetermined angular range. As mentioned above, this inquiry is made because, when writing text, users would rarely (if ever) want two portions of a single line to extend at radically different angles (most writing is relatively linear). FIGS. 8A and 8B illustrate one example of a way of determining the angle of a line grouping. Assume that the word "loops" in these figures constitutes a temporal line grouping. By finding the cusps and/or local minima and maxima for the stroke fragments, as described above, a series of points is produced, and these points generally extend in the base line direction of the line grouping. Therefore, if a "best line fit" was made between the local minima and maxima points of the line grouping (using conventional techniques, such as linear regression or the like), such as lines 808 and 818 illustrated in the figures, the angle of this line with respect to a fixed line (such as a horizontal or vertical line on the page template) can be used to provide the angular orientation of each initial and/or final temporal line grouping. By comparing the angular orientations of the line groupings (e.g., in Steps S720 and S760), long lines can be combined in some examples of the invention only when their angular orientations fall within a predetermined range. Because short line groupings typically will not have as many local minima and maxima points, the best fit line for short line groupings is more likely to extend in a direction other than the true direction of the line grouping. Therefore, the angular orientation feature is not relied upon as prohibiting merger of very short lines in the above-described example of the invention (although, as noted, tighter proximity tolerances may be used, if desired). The "best fit line" also may serve as a local horizontal base line for a line grouping.

FIGS. 8A and 8B generally illustrate an example of another feature that can be used to determine whether various merger operations are appropriate in processes and methods according to the invention. As described above, textual writing is often quite linear, with stroke fragments of relatively small height. One example of a way of measuring the linearity of a line of stroke data is through measurement of the line's fragment centroid error. The centroid error for a stroke fragment, as used in this example, is based on the distance that the fragment's centroid (e.g., the centroid of all points that make up the stroke fragment (the sum of all points in the fragment divided by the number of points for the X and Y coordinates)) lies from a regression line that best fits the line of strokes being evaluated. The fragment centroid error in a line of stroke data is the sum of the centroid errors for each stroke fragment in the line divided by the number of fragments in the line. Low centroid error means that the stroke fragments are located relatively close to the regression line, which means that the stroke fragments are more linear, and thus more likely to contain text. Large increases in centroid error when two lines are merged tends to indicate that the merged lines do not lie on a common line (and that a merger probably should not take place), whereas small increases in centroid error when two lines are merged tends to indicate that the two lines are close to collinear (and that merger is appropriate).

As a more concrete example of determining the centroid error, assume that the regression line fit to a line of strokes is represented by the following equation:

$$y=mx+b$$

(wherein m represents the slope of the regression line and b represents the regression line's Y axis intercept). Then, the fragment centroid error ($E_1$) for a centroid point P1 (coordinates (X1, Y1)) may be calculated as the absolute value of $mX_1+b - Y_1$ (any suitable units may be used, such as mm, digitizer pixels (also called "ink space units" herein), etc.) The centroid error for a given line of strokes, then, corresponds to the sum of the errors ($E_1$) for all fragment centroid points in the line divided by the number of fragments.

While both the initial and final temporal line grouping procedures are used in the above example of the invention, this is not a requirement in all examples of the invention. If desired, either one or neither temporal line groupings can be used in some examples without departing from the invention. Also, as noted above, many different ways of evaluating stroke size, relative stroke size, relative stroke location, relative line location, relative line angle or orientation, etc., can be used without departing from the invention. In the example of the invention illustrated in FIG. 4, the output from the temporal line grouping step 408 is used in the next step, a spatial block grouping procedure 410.

B. Spatial Block Grouping

Often, when writing text, a user may write several lines that relate to one another, and in many instances, one line is a direct continuation of the line immediately above it. When this occurs, the writing in one line typically has approximately the same angular or linear orientation as its surrounding lines, and the various lines are separated by a relatively small vertical distance. Additionally, when writing of this type occurs, the strokes in one line generally have about the same size as strokes in the surrounding lines. The spatial block grouping procedure 410 of FIG. 4 takes advantage of these general characteristics of conventional writing.

In general, the spatial block grouping procedure 410 according to this example compares the temporal line groupings obtained from engine 408 and determines whether physically adjacent lines should be grouped together as a block. The spatial block grouping procedure 410 according to this example of the invention does not consider the relative timing of one stroke or line as compared to the other strokes or lines in making a merger. Rather, the determination is made to merge two temporal line groupings based on at least one of their relative spatial (horizontal and/or vertical) orientation, their angular orientation, and/or their relative stroke size.

Figure 9B:
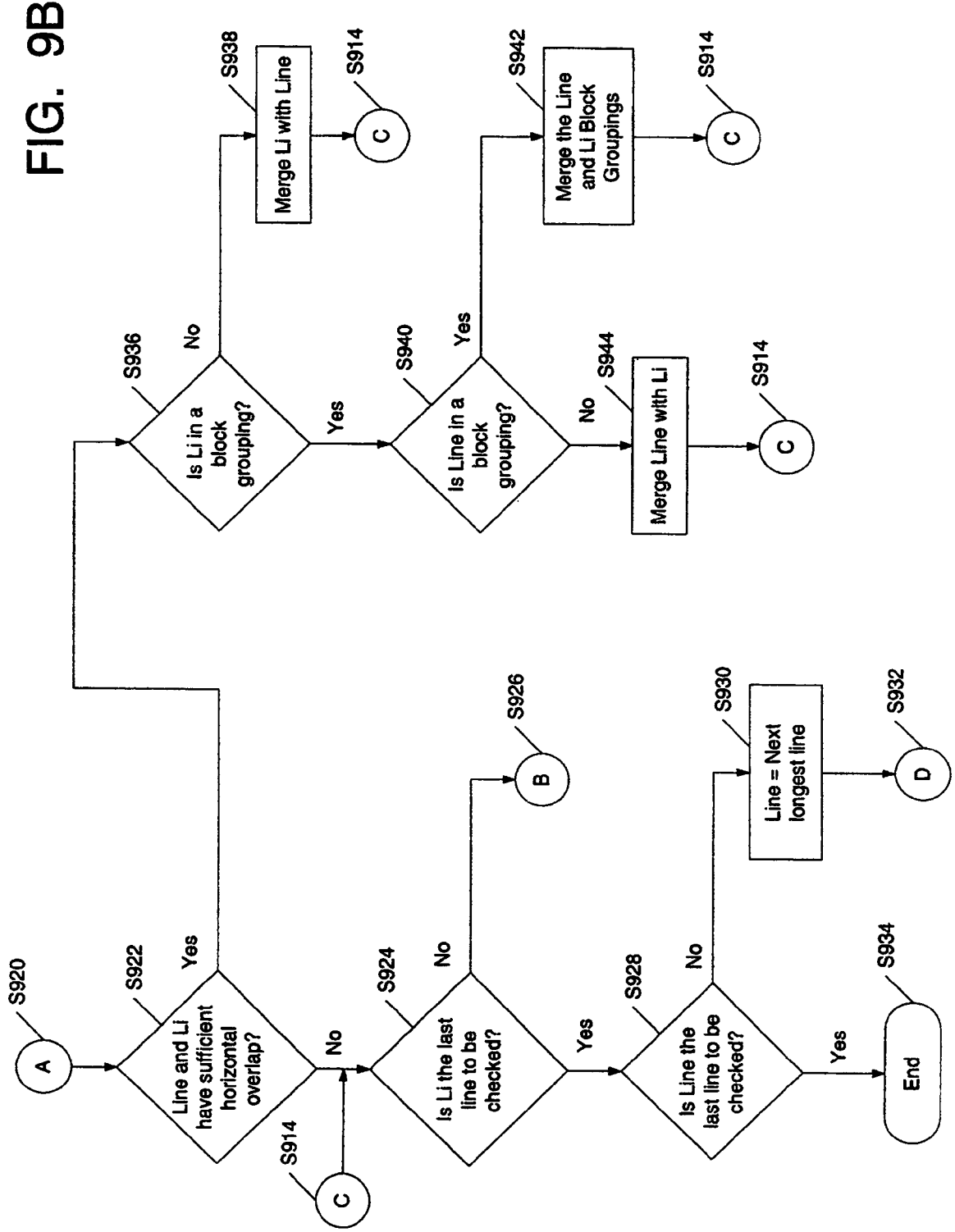

FIGS. 9A and 9B illustrate a sample flow diagram or algorithm for a spatial block grouping procedure 410 according to some examples of the invention. Like the procedure for providing the final temporal line groupings described above in conjunction with FIGS. 7A and 7B, the spatial block grouping procedure starts with the longest temporal line grouping (where the statistics have a larger number of sample points; Step S900, longest Line=Line) and works its way down to the shortest line grouping. The individual temporal line groupings in this example are compared against every other temporal line grouping on the page (lines L1 to L1) to determine whether merger into a block grouping would be appropriate. Thus, to start the analysis, the counter i is set equal to 1 (Step S902).

As initial steps in the procedure, the engine determines whether the line L1 being compared is the same as L1 (Step S904) or if L1 has already been grouped with Line into a spatial block (Step S906). If either of these answers is YES, further comparative analysis of these lines is not necessary. The line counter i is incremented by 1 (Step S910), and the procedure returns to Step S904.

If the answers at both Steps S904 and S906 are NO, the system recognizes that these two temporal line groupings have not previously been compared. Then, in Step S912, the procedure determines whether Line and L1 lie within a predetermined angular range. If NO, the line groupings are not considered good candidates for merger, and the procedure moves forward, as indicated by transfer bullet C (Step S914). The procedure after transfer bullet C (Step S914) will be described in more detail below in conjunction with FIG. 9B.

If Line and L1 lie within a predetermined angular orientation (Answer YES at Step S912), the procedure then determines whether the strokes in Line and L1 are within a predetermined size range (Step S916). If NO, the line groupings again are not considered good candidates for merger, and the procedure moves forward to transfer bullet C (Step S914). If the determination is YES at Step S916 (the stroke sizes are within a predetermined size range), the procedure then determines whether Line and L1 are close together vertically (Step S918) (optionally using the "best fit line" of Line as the horizontal base line). If NO, the line groupings again are not considered good candidates for merger, and the procedure moves to transfer bullet C (Step S914). If Line and L1 are within a predetermined vertical range (Answer YES), the procedure moves to transfer bullet A (Step S920), which transfers to the exemplary procedure illustrated in FIG. 9B.

As illustrated in FIG. 9B, the last test in this example to determine whether two temporal line groupings are candidates for merger relates to their relative horizontal overlap. In most text based handwriting, lines typically have some horizontal overlap with the lines above and below them (unless one of the lines is very short). Step S922 takes advantage of this fact by considering whether Line and L1 have horizontal overlap (optionally using the "best fit line" as the horizontal base line). If YES, the two temporal line groupings are considered to be good candidates for merger. If desired, prior to or after step S922, the systems and methods of this parse engine could determine whether one temporal line grouping is very short, and if so, this step of testing horizontal overlap could be skipped, ignored, or subjected to a different test condition. As an example, for two long lines, a 40% horizontal overlap may be deemed adequate for a spatial block grouping merger (e.g., 40% of the shorter of the two lines horizontally overlaps the longer line), whereas for a long line and a short line, a 70% horizontal overlap may be required.

If any test in Steps S912, S916, S918, or S922 is negative (Answer NO), the procedure has determined that Line and L1 are not good candidates for merger. Therefore, the procedure moves on to the next comparison. At Step S924, the procedure determines whether there are any more temporal line groupings L1 to compare with temporal line grouping Line, and if so, the procedure returns to step S910 in FIG. 9A (via transfer bullet B, Step S926). If L1 was the last temporal line grouping to be checked against temporal line grouping Line, the procedure then determines whether there is another line grouping to use as the base line for comparison (Step S928), and if so, it changes the Line value to the next longest temporal line grouping (Step S930), which will then serve as the basis for comparison, and returns the procedure to Step S902 (via transfer bullet D, Step S932). If all temporal line groupings have been checked against one another (Answer YES at Steps S924 and S928), the procedure terminates (Step S934).

Once it is determined that the temporal line groupings Line and L1 are good candidates for merger, the systems and methods according to this example of the invention merge the line groupings. First, it determines whether temporal line grouping L1 is already located in a spatial block grouping (Step S936). If NO, then L1 is merged as a spatial block with temporal line grouping Line (Step S938) (and any spatial block grouping containing Line), and the procedure then returns to Step S924 (via transfer bullet S914), where it determines whether additional temporal line groupings Line or L1 remain for processing. If L1 is already in a spatial block grouping (Answer YES at Step S936), the system of this example then determines whether temporal line grouping Line also is within a spatial block grouping (Step S940). If YES, the spatial block groupings containing Line and L1 are combined (Step S942), and the procedure returns to Step S924 (via transfer bullet C, Step S914). If L1 belongs to a spatial block grouping but Line does not (Answer NO at Step S940), then Line is merged with the spatial block grouping containing L1 (Step S944), and the procedure returns to Step S924 (via transfer bullet C, Step S914).

Figure 9C:
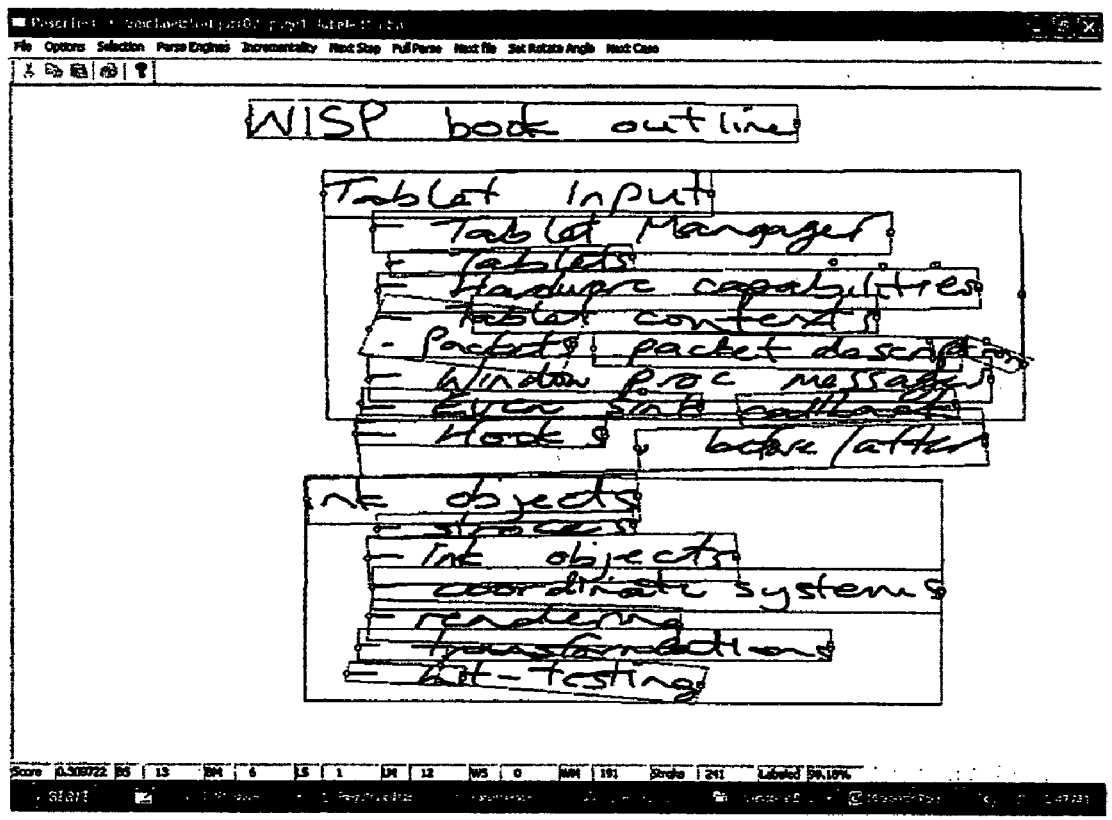
FIG. 9C illustrates an exemplary "screen shot" of a page of ink after operation of the spatial block grouping parse engine according to one example of the invention.

FIG. 9C illustrates an exemplary "screen shot" showing the groupings after the spatial block grouping process 410 has occurred according to one example of the invention. As compared with the screen shot of FIG. 7C, this screen shot illustrates the larger blocks of text that have been grouped together by this parse engine.

Of course, various other inquiries, steps, and procedures may be used to determine whether strokes and/or line groupings should be grouped together as a spatial block grouping without departing from the invention. Moreover, the specific tests and order of steps illustrated in FIGS. 9A and 9B could be changed, modified, or even omitted without departing from the invention. The spatial block grouping test of FIGS. 9A and 9B merely provides one example that may be used in accordance with the invention.

C. Spatial Line Grouping

As illustrated in the example of FIG. 4, the next step in the layout analysis procedure 302 is a spatial line grouping procedure 412. Using the temporal line groupings obtained from procedure 408, this procedure or engine 412 further expands the line groupings (if appropriate) based on their respective spatial arrangement. As described above, the temporal line groupings obtained through procedure 408 required that grouped strokes and lines be adjacent or consecutive in time. The spatial line grouping analysis 412 does not rely on time as a factor in determining whether physically adjacent strokes should be combined into a line grouping. In this manner, strokes added to a line out of temporal order (e.g., dotted "i's" and crossed "t's") will still be properly grouped with the other strokes in the appropriate line.

FIG. 10A illustrates a flow diagram for one example of a procedure for spatial line grouping. Starting with the temporal line groupings obtained in procedure 408, the lines are sorted by length in Step S1000, and the procedure processes starting from the longest line (Step 1002), moving to the shortest line. The physical location of each line grouping is compared against the other line groupings on the page (Line compared against L1), and merger is made when certain conditions are met. This procedure attempts to form the best merged line between the various line groupings, as will be explained in more detail below.

At Step S1004 in the procedure, the line grouping counter "i" is set to 1. The procedure then determines whether the base line grouping Line is the same as the test line grouping L1 (Step S1006) or if the test line grouping L1 is already merged with the base line grouping Line (Step S1008). If the answer to either of these inquiries is YES, further processing is unnecessary with respect to these two line groupings, the counter i is incremented by one (Step S1010), and the procedure returns to Step S1006.

If both Steps S1006 and S1008 produce NO answers, the procedure then determines whether the line groupings Line and L1 are good candidates for merger (Step S1012). The tests used for making this determination may be, for example, the same as or similar to those used in making the temporal line groupings shown in FIGS. 7A and 7B (e.g., whether the stroke sizes in the line groupings are within a predetermined range, whether the line groupings are physically located within a predetermined range, whether the line groupings lie within a predetermined angular orientation, etc.), although, if desired, other tests may be used and/or the parameters for making a merger could be varied. If the line groupings Line and L1 are good candidates for merger, this fact is noted (Step S1014).

Once the possibility for merger is determined and stored, if appropriate, the procedure then determines whether the test line grouping L1 was the last line grouping to test (Step S1016). If NO, the test line grouping counter i is incremented (Step S1010), and the testing cycle repeats. If L1 is the last test line grouping (Answer YES at Step S1016), the procedure then determines which merger of Line and the various L1's forms the best merger choice (Step 1018). Various factors may be involved in making this determination. For example, the system could determine which combination of Line and the L1's form the best horizontal and vertical match. Additionally, the results of the spatial block grouping (procedure 410 described above) can be used in this test, to determine whether Line and a given L1 fall into a common block. Overall linearity between Line and the various possible L1 candidates also could be considered (e.g., using the fragment centroid error test described above). Once the best merger candidate is determined, Line and the best candidate L1 are merged together as a spatial line grouping in Step S1020. The procedure then determines whether base line groupings Line was the last line grouping to be processed (Step S1022). If NO, the base line grouping Line is set equal to the next longest line (Step S1024), and the procedure returns to Step S1004, as shown by transfer bullet A (Step S1026). If there are no additional base line groupings to process (Answer YES at Step S1022), the procedure terminates (Step S1028).

Figure 10B:
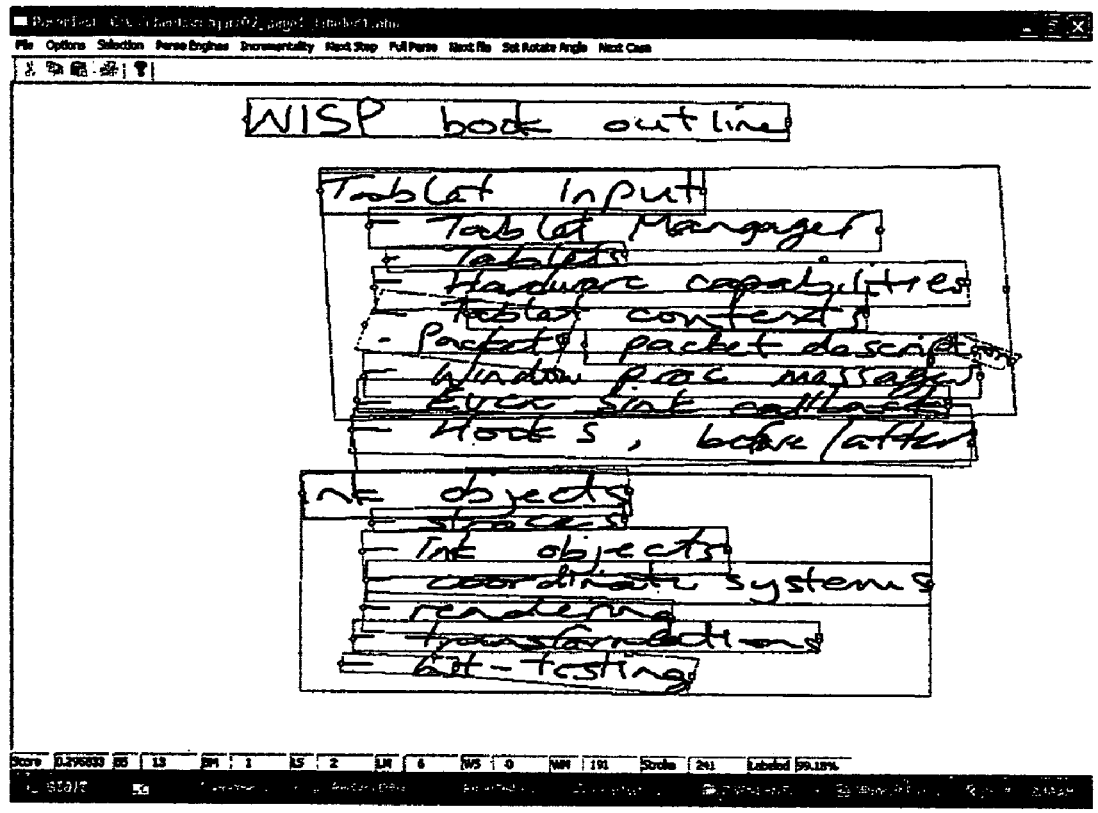
FIG. 10B illustrates an exemplary "screen shot" of a page of ink after operation of the spatial line grouping parse engine according to one example of the invention.

FIG. 10B illustrates an exemplary "screen shot" obtained as a result of operation of the spatial line grouping parse engine according to one example of the invention. A comparison of this screen shot with those in FIGS. 7C and 9C illustrates that this parse engine has combined at least some lines that were previously maintained separate by the temporal line grouping parse engine 408.

As with the other parse engines, the various steps and procedures illustrated in FIG. 10A may be changed in order, modified, and/or omitted without departing from the invention. Moreover, in determining the various statistics of the Line, statistics over an entire spatial block grouping containing the Line (if any) may be used, for example, in calculating stroke fragment size, line angle, etc.

D. List Detection

As described above, at least some times when users write listings, they will write a column of numbers or letters, and then fill in the list elements. As another alternative, some times users will write out the content of a list, and then later add a column of numbers, letters, or bullet points. Relying on these features common in list making, a list detection step 414 may be provided in some examples of the invention. Once it is determined that two blocks of text constitute a single list, the list element identifier (e.g., the number, letter, bullet point, etc.) may be combined with the associated list element and, if desired, the list elements may be segregated from one another as a block by a hard return or in some other appropriate manner (e.g., so that one list element will not combine with the next list element when the text of the list is adjusted in some manner (e.g., by copying, pasting, adding text, deleting text, changing margins, etc.)).

In general, when a list is made in the manner described above, the input ink on the page will contain some distinguishing characteristics. First, the page will contain at least two independent blocks of text as determined by the spatial block grouping engine 410 (one block including the list content and one block representing the list element headers). The block containing the list element headers (e.g., the numbers, letters, bullet points, etc.) may be grouped by the temporal line grouping engine 408 as a single line extending approximately perpendicular to the multiple lines contained in the adjacent list content block. Moreover, the individual strokes in the list element header block will break at locations that roughly correspond to at least some of the lines in the adjacent list content block. When these conditions are met, the list detection parse engine according to this example of the invention determines that a list has been created. The two blocks can then be merged together, and the list element headers may be merged to head the respective lines of the adjacent list content block.

Figure 11:
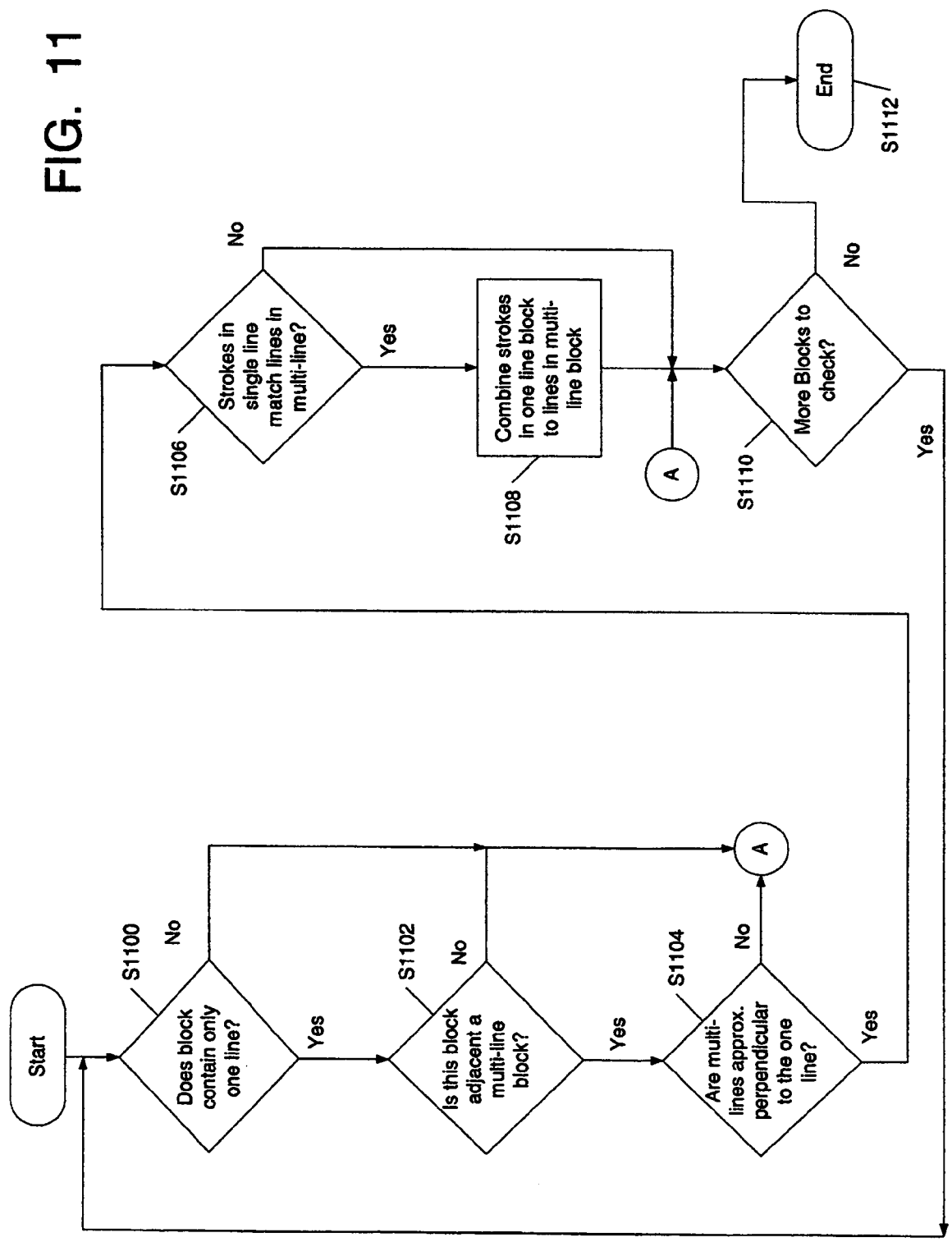
FIG. 11 illustrates an exemplary flow diagram of a list detection procedure or parse engine useful in some examples of the layout analysis procedure of the present invention.

FIG. 11 illustrates an example of a flow diagram for a list detection engine or algorithm useful in some examples of the invention. First, the procedure determines in Step S1100 whether any block of text on the page contains a single line. If YES, the procedure then determines whether this single line block is adjacent a spatial block grouping containing multiple lines (Step S1102). If the answer is again YES, the procedure then determines at Step S1104 whether the lines in the multi-line block are approximately perpendicular to the line in the single line block. If that answer also is YES, the procedure then determines whether the individual strokes in the single line block match up with lines in the multi-line block (Step S1106). This step helps prevent erroneous list detection in the event that the user writes a line of text or makes a drawing along the side of and roughly perpendicular to another block of text on the page.

If the answers at Steps S1100, S1102, S1104, and S1106 are all YES, this procedure determines that the user intended to produce a single list in these two blocks, and the strokes in the single line block are combined with the lines in the multi-line block (Step S1108). If the answer at any one of Steps S1100, S1102, S1104, or S1106 is NO, or after the merger occurs at Step S1108, the procedure then determines if any additional blocks remain to be checked (Step S1110) and (if necessary) repeats the procedure for the next block beginning at Step S1100. If no blocks remain to be checked at Step 1110, the procedure terminates (Step 1112).

As one of ordinary skill in the art can readily appreciate, the various steps in this procedure or their order can be changed, modified, or omitted without departing from the invention.

E. Spatial Word Grouping

Figure 12A:
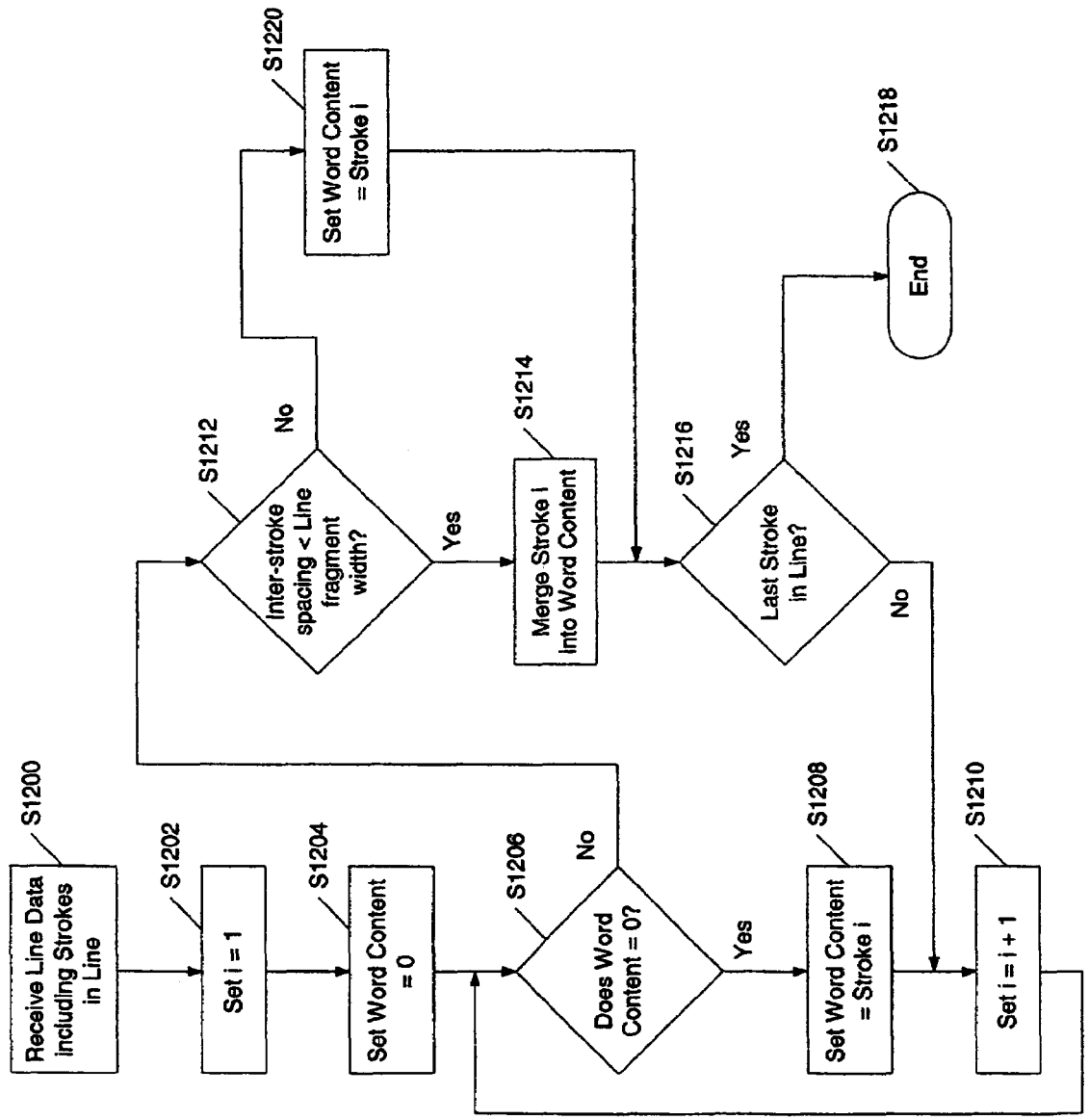
FIG. 12A illustrates an exemplary flow diagram of a spatial word grouping procedure or parse engine useful in some examples of the layout analysis procedure of the present invention.

Another feature or parse engine of the layout analysis procedure 302 of FIG. 4 is the spatial word grouping procedure or parse engine 416. In general, projecting the strokes of each line along the axis of the line's base line orientation, the spatial word grouping procedure divides the lines of input ink into one or more words that contain one or more associated strokes. FIG. 12A illustrates a flow diagram of one possible algorithm for performing this spatial word grouping procedure.

In Step S1200, the line data, including the strokes present in the line, is received. The stroke counter, i is initially set equal to 1 (Step S1202), and the word content memory is set equal to zero (Step S1204). The procedure then determines whether the word content equals 0 (Step S1206). If YES, the word content is set equal to Stroke i's content (Step S1208), and the stroke increment counter i is increased by one (Step S1210). The procedure then returns to Step S1206.

When the word content does not equal zero at Step S1206, the procedure then determines whether the spacing between adjacent strokes (also called the "inter-stroke spacing") is less than a predetermined amount (Step S1212). In the example illustrated in FIG. 12, the predetermined inter-stroke spacing test amount is based on the stroke fragment size (e.g., less than the average or median stroke fragment width), but other test spacings are possible without departing from the invention. By tying the inter-stroke spacing to the stroke fragment size, at least in some matter, this procedure can take into account different writing stroke sizes. When people write large text, they will generally have a greater inter-stroke spacing between words then they will have when they write smaller text. By not confining the test to a predetermined physical spacing (e.g., at least ten digitizer points), the systems and methods according to this example of the invention can accommodate printing and writing of different sizes. Of course, a predetermined physical spacing could be used, if desired, without departing from this invention.

If the spacing between adjacent strokes is less than the predetermined width (Answer YES at Step S1212), the procedure determines that Stroke i should be merged into the Word, and the merger occurs at Step S1214. The procedure then determines whether the line contains any additional strokes (Step S1216), and if so, returns to Step S1210. If no strokes remain to be checked at Step S1216, the procedure terminates (Step S1218) and/or moves on to the next line.

If, at Step S1212, the procedure determines that Stroke i should not be merged with the existing Word, Stroke i starts a new Word (Word Content=Stroke i; Step S1220). The procedure then returns to Step S1216, to determine whether additional strokes exist in the line. Of course, each Word is stored independent of the other Words as this procedure progresses.

Figure 12B:
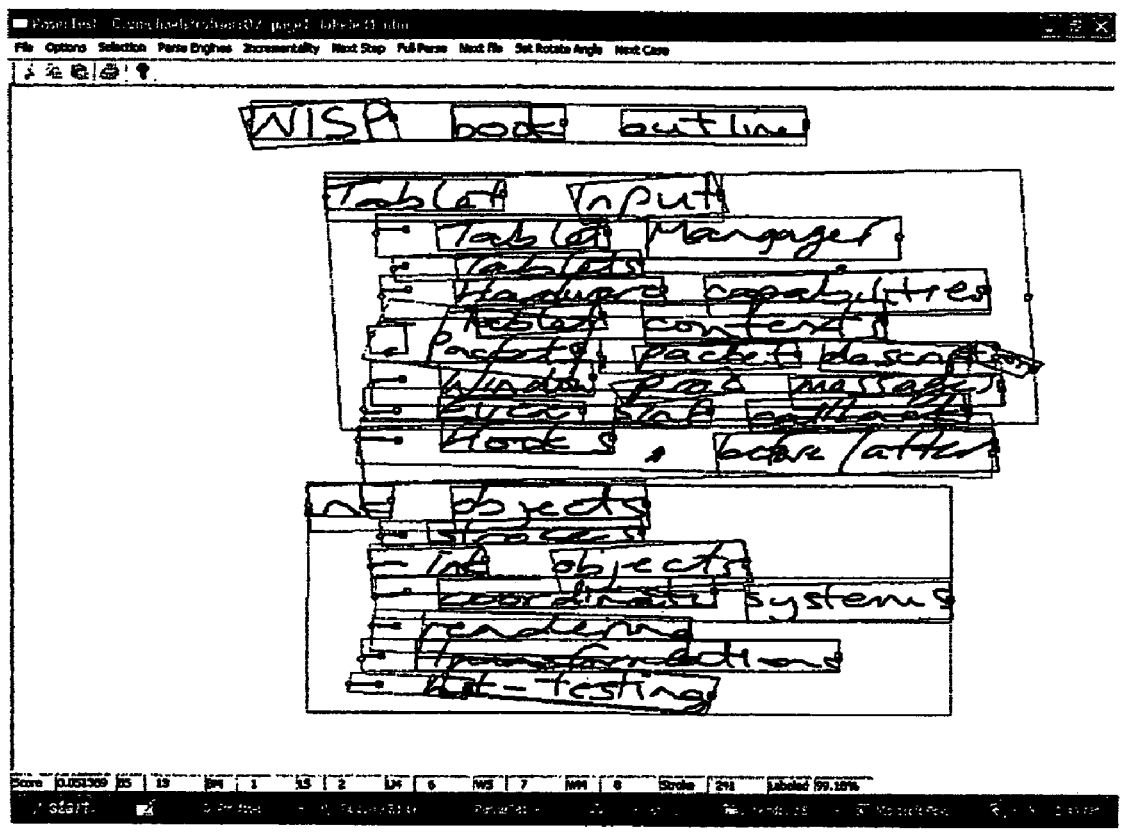
FIG. 12B illustrates an exemplary "screen shot" of a page of ink after operation of the spatial word grouping parse engine according to one example of the invention.

FIG. 12B illustrates an exemplary "screen shot" after operation of the spatial word grouping parse engine 416 according to one example of the invention. By comparing with FIG. 10B, one can readily see the word breaks in each line as ascertained by this parse engine.

As with the other procedures described above, the specific features of the spatial word ordering procedure and engine described above merely constitute examples of steps and methods useful in this specific example of the invention. The specific steps or their order can be changed, modified, or omitted without departing from the invention. For example, if desired, the spatial word grouping step can be omitted and the lines of ink from the spatial line grouping step may be sent directly to a handwriting recognition system.

F. Specific Examples of Possible Tests and Threshold Levels

The above description mentions several possible tests and threshold levels that may be used in examples of the systems and methods according to the invention for determining whether various groupings should be made (e.g., temporal line groupings, spatial line groupings, spatial block groupings, groupings as part of the list detection procedure, etc.). Using routine experimentation, those skilled in the art can readily determine suitable tests, threshold values, and combinations thereof useful in determining whether various groupings should be made. The following description, however, provides various specific examples of suitable threshold values and/or tests that may be used in some examples of the invention. A given example of a system or method according to the invention may use any suitable number of these threshold levels or tests in determining whether to group individual strokes into words, lines, and/or blocks.

For the initial temporal line grouping procedure, the following Table illustrates one example of suitable tests and/or threshold values that may be used in determining whether to group two temporally adjacent strokes and/or line groupings into a single, initial temporal line grouping:

| Test Parameter | Threshold or Test Value |
| --- | --- |
| For two long lines - Maximum angle difference between the two lines[1] | 0.5 Radians |
| For two long lines - Maximum horizontal gap between the two lines | 2 × Median Fragment Width[2] |
| For two long lines - Maximum vertical gap between the two lines | 0.75 × Median Fragment Height[2] |
| For two long lines - Maximum ratio of median fragment widths between the two lines | 3 |

-continued

| Test Parameter | Threshold or Test Value |
| --- | --- |
| For two long lines - Maximum ratio of median fragment heights between the two lines | 3 |
| For one long and one short line - Maximum horizontal gap between the two lines | 5 × Median Fragment Width |
| For one long and one short line - Maximum vertical gap between the two lines | 0.5 × Median Fragment Height |
| For one long and one short line, when the short line is a dot - Maximum horizontal gap between the two lines | 1 × Median Fragment Width |
| For one long and one short line, when the short line is a dot - Maximum vertical gap between the two lines | 1 × Median Fragment Height |
| For one long and one short line - Maximum ratio of median fragment heights between the two lines | 5 |
| For one long and one short line - Maximum ratio of median fragment widths between the two lines | 5 |
| For two short lines - Maximum ratio of convex distance between the two lines to median fragment width[3] | 2 |
| For two short lines - Maximum ratio of median fragment heights between the two lines | 4 |
| For two short lines - Minimum distance between two separate lines | 150 ink space units[4] |
| For two short lines - Maximum ratio of median fragment widths between the two lines | 4 |
| Maximum fragment centroid error increase when two lines are merged[5] | $1 \times 10^{+4}$ (based on ink space units) |

[1] Line groupings can be characterized as "long" or "short" in any suitable manner. For example, if a line grouping contains more than 7 stroke fragments, it may be considered "long," whereas a line containing 7 or fewer stroke fragments may be considered "short."
[2] Median Fragment Height or Width of the longer line is used. If desired, these parameters may be based on: the fragment height or width of the shorter line or the longer line; a combination of the two lines; the minimum, maximum, median, or average of the two lines; etc., without departing from the invention.
[3] For a given stroke or set of strokes, the "convex hull" of the stroke or stroke set is defined as the minimum sized polygon that encloses the stroke or stroke set. For example, for the letter "E," the convex hull would be a rectangle surrounding the letter. For the letter "L," the convex hull would be a right triangle. For two sets of strokes, A and B, the "convex distance" is the minimum distance between the convex hulls enclosing the strokes.
[4] This is a unit based on pixel spacing in a digitizer used in one example of the invention (e.g., akin to digitizer pixels). These values may change from system to system, for example, depending on the resolution of the digitizer. The skilled artisan can appropriately select this parameter, if desired, through the use of routine experimentation.
[5] Compares the fragment centroid error for the longer line before a merger and after a merger. If the fragment centroid error increases by more than this threshold amount as a result of a merger operation, the merger will not occur.

Any number of the above tests and threshold conditions may be used in determining whether a grouping is appropriate. Failure to fulfill one or more of these conditions, in at least some examples of the invention, may be relied upon to prevent an initial temporal line grouping from being made between the two lines being tested.

In some examples of the invention, a final temporal line grouping procedure takes place after the initial temporal line grouping procedure. The following Table illustrates one example of suitable tests and/or threshold values that may be used in determining whether to group two temporally adjacent initial temporal line groupings into a single, final temporal line grouping:

| Test Parameter | Test or Threshold Value |
| --- | --- |
| For two long lines - Maximum angle difference between the two lines | 0.5 Radians |
| For two long lines - Maximum horizontal gap between the two lines | 10 × Median Fragment Width |
| For two long lines - Maximum vertical gap between the two lines | 2.1 × Median Fragment Height |
| For two long lines - Maximum ratio of median fragment widths between the two lines | 3 |
| For two long lines - Maximum ratio of median fragment heights between the two lines | 3 |
| For one long and one short line - Maximum horizontal gap between the two lines | 14 × Median Fragment Width |
| For one long and one short line - Maximum vertical gap between the two lines | 1.9 × Median Fragment Height |
| For one long and one short line, when the short line is a dot - Maximum horizontal gap between the two lines | 3.5 × Median Fragment Width |

-continued

| Test Parameter | Test or Threshold Value |
|---|---|
| For one long and one short line, when the short line is a dot - Maximum vertical gap between the two lines | 1.9 × Median Fragment Height |
| For one long and one short line - Maximum ratio of median fragment heights between the two lines | 3 |
| For one long and one short line - Maximum ratio of median fragment widths between the two lines | 3 |
| For two short lines - Maximum ratio of convex distance between the two lines to median fragment width | 4 |
| For two short lines - Maximum ratio of median fragment heights between the two lines | 5.5 |
| For two short lines - Minimum distance between two separate lines | 150 ink space units |
| For two short lines - Maximum ratio of median fragment widths between the two lines | 5.5 |
| Maximum fragment centroid error increase when two lines are merged | $1 \times 10^{+4}$ (based on ink space units) |

Again, any number of the above tests and threshold conditions may be used in determining whether a grouping is appropriate. Failure to fulfill one or more of these conditions, in at least some examples of the invention, may be relied upon to prevent grouping together two temporally adjacent temporal line groupings.

As described above, another procedure in the layout analysis, in at least some examples of the invention, is a spatial line grouping procedure. In it, two spatially proximate temporal line groupings may be further grouped together to form a larger, spatial line grouping. The following Table illustrates one example of suitable tests and/or threshold values that may be used in determining whether to group two closely located line groupings into a single spatial line grouping:

| Test Parameter | Test or Threshold Value |
|---|---|
| For two long lines - Maximum angle difference between the two lines | 0.5 Radians |
| For two long lines - Maximum horizontal gap between the two lines | 11 × Median Fragment Width |
| For two long lines - Maximum vertical gap between the two lines | 0.6 × Median Fragment Height |
| For two long lines - Maximum ratio of median fragment widths between the two lines | 3 |
| For two long lines - Maximum ratio of median fragment heights between the two lines | 3.3 |
| For one long and one short line - Maximum horizontal gap between the two lines | 6 × Median Fragment Width |
| For one long and one short line - Maximum vertical gap between the two lines | 0.6 × Median Fragment Height |
| For one long and one short line, when the short line is a dot - Maximum horizontal gap between the two lines | 2 × Median Fragment Width |
| For one long and one short line, when the short line is a dot - Maximum vertical gap between the two lines | 3 × Median Fragment Height |
| For one long and one short line - Maximum ratio of median fragment heights between the two lines | 5 |
| For one long and one short line - Maximum ratio of median fragment widths between the two lines | **[6] |
| For two short lines - Maximum ratio of convex distance between the two lines to median fragment width | 5 |
| For two short lines - Maximum ratio of median fragment heights between the two lines | 5 |
| For two short lines - Minimum distance between two separate lines | 750 ink space units |
| For two short lines - Maximum ratio of median fragment widths between the two lines | 5 |
| Maximum fragment centroid error increase when two lines are merged | $1 \times 10^{+4}$ (based on ink space units) |

[6]Any appropriate test or threshold value could be set, if desired.

As with the previous tests and threshold conditions, any number of the above tests and threshold conditions may be used in determining whether a grouping is appropriate. Failure to fulfill one or more of these conditions, in at least some examples of the invention, may be relied upon to prevent a merger of the two lines being tested.

The spatial block grouping engine discussed above also may include various tests and/or threshold conditions that determine whether a grouping is appropriate. In the spatial block grouping engine of some examples of the invention, temporal line groupings that are located close together may be grouped together in a spatial block, provided conditions for their merger are met. The following describes various specific tests and conditions that may be used in at least some examples of the invention in determining whether such a grouping should be made:

| Test Parameter | Test or Threshold Value |
|---|---|
| For one long and one short line - Maximum ratio of median fragments heights between the two lines | 6 |
| For one long and one short line - Minimum ratio of horizontal overlap between two lines of separate blocks to median fragment width | 0.7 |
| For one long and one short line - Minimum ratio of vertical gap between two lines of separate blocks to median fragment height | 5 |
| For two long lines - Maximum ratio of median fragment heights between the two lines | 3 |
| For two long lines - Maximum angle difference | 0.4 Radians |
| For two long lines - Minimum ratio of horizontal overlap between two lines of separate blocks to median fragment width | 0.4 |
| For two long lines - Minimum ratio of vertical gap between two lines of separate blocks to median fragment height | 2.5 |

As with the previous tests and threshold conditions, any number of the above tests and threshold conditions may be used in determining whether a spatial block grouping is appropriate. Failure to fulfill one or more of these conditions, in at least some examples of the invention, may be relied upon to prevent a block grouping of the two lines being tested.

The list detection engine described above also may include various tests and threshold conditions that dictate whether mergers should be made between the elements in the single line block and individual lines in the multi-line block. The following describes various specific tests and conditions that may be used in at least some examples of the invention in determining whether groupings should be made on the basis that the evaluated blocks constitute a single list:

| Test Parameter | Test or Threshold Value |
|---|---|
| Maximum angle difference between a line perpendicular to the single line block and a median orientation of the lines in the multi-line block | 15 |
| Maximum ratio of the distance between the single line and the multi-line blocks and the median fragment width | 4 |
| Maximum ratio of the median fragment widths of the single line block to the multi-line block | 2 |
| Minimum percentage of single line strokes that must merge with a line in the multi-line block, with high confidence, when list groupings are made[7] | 75% |

[7] Any suitable standard may be used to confirm that the stroke from the single.line block merges with high confidence with a line in the multi-line block (e.g., below a threshold level increase in fragment centroid error).

Again, any number of the above tests and threshold conditions may be used in determining whether a list grouping is appropriate. Failure to fulfill one or more of these conditions, in at least some examples of the invention, may be relied upon to prevent a list grouping from being made.

G. Conclusion

As a result of the layout analysis procedure and engine described above, the original individual ink strokes on the page template have been parsed from their original form to a series of associated ink words, lines, and blocks. The data structure resulting from this processing may be thought of as a document tree or parse tree, as illustrated in FIG. 5B, wherein associated strokes 500 are grouped or combined to form ink words 510, associated words 510 combine to form lines 512, and associated lines 512 combine to form blocks 514, and a given page 508 may contain one or more blocks. Parsing the input ink data in this manner provides advantages as one utilizes other features potentially available in an ink processing system, such as selecting portions of the ink (e.g., for copying, cutting, pasting, etc.), editing the ink (e.g., deleting, inserting, formatting, etc.), sending the ink to a handwriting recognition system, searching, selecting, or other applications or other repurposing.

V. Other Features

The layout analysis procedure 302 according to this example of the invention can be applied to electronic ink in any suitable manner, for example, as a post ink entry process, on a page-by-page basis. Advantageously, however, the layout analysis procedure will operate incrementally, as the user generates and adds ink text in the pen-based computing environment.

FIG. 13 illustrates a general schematic diagram of a system in which data layout analysis may proceed incrementally, as a user 1300 adds ink to a page. First, the application program in which the user 1300 operates will have a document tree data structure 1302. In order to make the document tree data structure 1302 available for processing as the user 1300 adds additional ink to the document tree data structure 1302, the layout analysis system or parser will contain a mirror copy of the document tree data structure 1302 taken at some point in time. The mirror copy is called a "mirror tree" data structure 1304 in FIG. 13. Once the mirror tree data structure 1304 is produced, it can be transferred as a "snapshot" to the parser system or thread 1306 and/or to a handwriting recognition system 1308. The parser system 1306 and/or the handwriting recognition system or thread 1308 may operate in the "background," while the user potentially adds additional ink to the document tree data structure 1302. When the parser system 1306 and/or handwriting recognition system 1308 complete their operations on the mirror tree snapshot, they send the results back to the original application program, committing the changes to the document tree data structure 1302, which is then copied into the mirror tree data structure 1304. New "snapshots" can then be taken, and the parser system 1306 and/or recognition system 1308 can operate on the new snapshot (optionally focusing on changes made since the previous snapshot was analyzed).

In this manner, the layout analysis systems and methods according to these examples of the invention can incrementally operate as changes are made to the original document 1302, which can reduce processing time, at least from the user's point of view.

VI. Conclusion

While the invention has been described in terms of various specific examples, these specific examples merely exemplify the invention and do not limit it. Additionally, those of ordinary skill in the art will be capable of determining the appropriate predetermined stroke size ranges, stroke proximity ranges, stroke or line angle ranges, and other threshold values through the exercise of routine experimentation. Moreover, the fact that a specific feature or function of the invention is described in conjunction with a specific example does not mean that this feature or function is limited to use with that specific example of the invention or that every example must include that specific feature or function. Rather, unless otherwise specified, the various features and functions described above may be used freely in any example of the invention. Those skilled in the art will appreciate that changes and modifications may be made to the exemplified versions of the invention without departing from the spirit and scope of the invention, as defined in the appended claims.

We claim:

1. A system, comprising:
    an input system for receiving strokes representing digital ink; and
    a processor system for: (a) grouping temporally consecutive strokes into an initial temporal line grouping, wherein at least a portion of each stroke within the initial temporal line grouping is located within a first predetermined distance of another stroke in that initial temporal line grouping, and (b) grouping temporally consecutive initial temporal line groupings into one or more final temporal line groupings, wherein at least a portion of each initial temporal line grouping within the final temporal line grouping is located within a second predetermined distance of another initial temporal line grouping in that final temporal line grouping and wherein each of the initial temporal line groupings within the final temporal line grouping has a predetermined orientation with respect to a plurality of other initial temporal line groupings within the final temporal line grouping.

2. A system according to claim 1, wherein each stroke forming an initial temporal line grouping has a stroke size, and wherein each stroke size in the initial temporal line grouping is within a predetermined size range with respect to other stroke sizes in that initial temporal line grouping.

3. A system according to claim 1, wherein each initial temporal line grouping forming one of the final temporal line groupings contains strokes that are within a predetermined size range with respect to the strokes in other initial temporal line groupings in that final temporal line grouping.

4. A system according to claim 1, wherein the processor system further groups plural final temporal line groupings together to form a spatial block grouping when two or more temporal line groupings have a first predetermined spatial relationship or orientation.

5. A system according to claim 4, wherein the processor system further groups plural final temporal line groupings together to form a spatial line grouping when two or more final temporal line groupings lie within a common spatial block grouping and have a second predetermined spatial relationship or orientation.

6. A system according to claim 1, wherein the processor system further groups two or more final temporal line groupings to form at least a portion of a spatial line grouping when the two final temporal line groupings have a first predetermined spatial relationship or orientation.

7. A system according to claim 6, wherein the processor system further groups strokes in the spatial line grouping to form one or more spatial word groupings, wherein each stroke within a spatial word grouping is located within a third predetermined distance of another stroke in that spatial word grouping.

8. A system, comprising:
    an input system for receiving strokes representing digital ink; and
    a processor system for (a) grouping temporally consecutive strokes into a temporal line grouping, wherein at least a portion of each stroke within the temporal line grouping has a first predetermined orientation with respect to a plurality of other strokes in that temporal line grouping, and (b) grouping plural temporal line groupings together to form a spatial block grouping when two or more temporal line groupings have a second predetermined orientation.

9. A system according to claim 8, wherein the grouping of temporally consecutive strokes includes: grouping two temporally consecutive strokes into an initial temporal line grouping when at least a portion of a first stroke is located within a first predetermined distance of a second stroke, and grouping temporally consecutive initial temporal line groupings into one or more final temporal line groupings, wherein at least a portion of each initial temporal line grouping within the final temporal line grouping is located within a second predetermined distance of another initial temporal line grouping in that final temporal line grouping.

10. A system according to claim 8, wherein each stroke forming the temporal line grouping has a stroke size, and wherein each stroke size in the temporal line grouping falls within a predetermined size range with respect to the size of a plurality of other strokes in that temporal line grouping.

11. A system according to claim 8, wherein the processor system further groups plural temporal line groupings together to form a spatial line grouping when two or more adjacent temporal line groupings have a third predetermined orientation to form a common spatial block grouping.

12. A system according to claim 11, wherein the processor system further groups strokes in the spatial line grouping to form one or more spatial word groupings, wherein each stroke within a spatial word grouping is located within a first predetermined distance of another stroke in that spatial word grouping.

13. A system, comprising:
    an input system for receiving strokes representing digital ink; and
    a processor system for (a) grouping temporally consecutive strokes into a temporal line grouping by comparing an orientation of temporally adjacent strokes, wherein at least a portion of each stroke within the temporal line grouping has a first predetermined orientation with respect to another stroke in that temporal line grouping, and (b) grouping plural temporal line groupings together to form a spatial line grouping when two or more temporal line groupings have a second predetermined orientation.

14. A system according to claim 13, wherein the grouping of temporally consecutive strokes includes: grouping two temporally consecutive strokes into an initial temporal line grouping when at least a portion of a first stroke is located within a first predetermined distance of a second stroke, and grouping temporally consecutive initial temporal line groupings into one or more final temporal line groupings, wherein at least a portion of each initial temporal line grouping within the final temporal line grouping is located within a second predetermined distance of another initial temporal line grouping in that final temporal line grouping.

15. A system according to claim 13, wherein each stroke forming the temporal line grouping has a stroke size, and wherein each stroke size in the temporal line grouping falls within a predetermined size range with respect to other stroke sizes in that temporal line grouping.

16. A system according to claim 13, wherein the processor system further groups plural temporal line groupings together to form a spatial block grouping when two or more temporal line groupings have a third predetermined spatial relationship or orientation.

17. A system according to claim 13, wherein the processor system further groups strokes in the spatial line grouping to form one or more spatial word groupings, wherein each stroke within a spatial word grouping is located within a first predetermined distance of another stroke in that spatial word grouping.

18. A system, comprising:
    an input system for receiving strokes representing digital ink; and
    a processor system for: (a) grouping temporally consecutive strokes into an initial temporal line grouping, wherein at least a portion of each stroke within the initial temporal line grouping is located within a first predetermined distance of another stroke in that initial temporal line grouping and the size of each stroke is within a predetermined size range of another stroke as determined by a comparison of a characteristic of a fragment size of each stroke; and (b) grouping temporally consecutive initial temporal line groupings into one or more final temporal line groupings, wherein at least a portion of each initial temporal line grouping within the final temporal line grouping is located within a second predetermined distance of another initial temporal line grouping in that final temporal line grouping.

19. The system of claim 18, wherein the characteristic of die fragment size compared is the average stroke fragment height of the strokes in the initial temporal line grouping.

20. The system of claim 18, wherein tile characteristic of the fragment size compared is the average stroke fragment width of the strokes in the initial temporal line grouping.

* * * * *

UNITED STATES PATENT AND TRADEMARK OFFICE
CERTIFICATE OF CORRECTION

| | |
|---|---|
| PATENT NO. | : 7,397,950 B2 |
| APPLICATION NO. | : 11/281462 |
| DATED | : July 8, 2008 |
| INVENTOR(S) | : Michael M. Shilman et al. |

It is certified that error appears in the above-identified patent and that said Letters Patent is hereby corrected as shown below:

In column 32, line 17, in Claim 19, delete "die" and insert -- the --, therefor.

In column 32, line 19, in Claim 20, delete "tile" and insert -- the --, therefor.

Signed and Sealed this
Tenth Day of May, 2011

David J. Kappos
*Director of the United States Patent and Trademark Office*